United States Patent
Abe

(10) Patent No.: US 8,150,809 B2
(45) Date of Patent: Apr. 3, 2012

(54) FILE DELETE METHOD, FILE OPEN METHOD, STORAGE MEDIUM STORING FILE DELETE PROGRAM, AND STORAGE MEDIUM STORING FILE OPEN PROGRAM

(75) Inventor: Naoki Abe, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 894 days.

(21) Appl. No.: 11/468,592

(22) Filed: Aug. 30, 2006

(65) Prior Publication Data

US 2007/0162525 A1    Jul. 12, 2007

(30) Foreign Application Priority Data

Jan. 11, 2006  (JP) ................................. 2006-003348

(51) Int. Cl.
*G06F 7/00* (2006.01)
*G06F 17/00* (2006.01)
(52) U.S. Cl. ...................................................... 707/640
(58) Field of Classification Search .............. 707/1, 640, 707/999.001
See application file for complete search history.

(56) References Cited

U.S. PATENT DOCUMENTS

| | | | | |
|---|---|---|---|---|
| 5,564,037 | A | * | 10/1996 | Lam .............................. 711/161 |
| 5,909,540 | A | * | 6/1999 | Carter et al. ....................... 714/4 |
| 5,960,446 | A | * | 9/1999 | Schmuck et al. ............. 707/205 |
| 6,366,977 | B1 | * | 4/2002 | Mizoguchi ..................... 711/103 |
| 6,496,837 | B1 | * | 12/2002 | Howard et al. ............... 707/200 |
| 6,615,217 | B2 | * | 9/2003 | Rosensteel et al. ........... 707/101 |
| 6,823,398 | B1 | * | 11/2004 | Lee et al. ........................... 710/5 |
| 2007/0094471 | A1 | * | 4/2007 | Shaath et al. ................. 711/163 |

FOREIGN PATENT DOCUMENTS

| | | |
|---|---|---|
| JP | 2001-325135 | 11/2001 |
| JP | 2003-58400 | 2/2003 |
| JP | 2004-30305 | 1/2004 |
| WO | 2005/071549 A | 8/2005 |

OTHER PUBLICATIONS

Minoura, "Practial Study of Demanded File System", Interface, Jul. 2001, pp. 55-134.
Minoura, "Microsoft Extensible Firmware Initiative FAT 32 File System Specification", Hardware White Paper, Microsoft Corporation, pp. 1-34., Dec. 6, 2000.
Japanese Office Action issued May 10, 2011 in corresponding Japanese Patent Application 2006-003348.

* cited by examiner

*Primary Examiner* — Aleksandr Kerzhner
(74) *Attorney, Agent, or Firm* — Staas & Halsey LLP

(57) ABSTRACT

A proposed file delete method is a method used by a computer or a file processing device performing a process of outputting to a device driver a directive corresponding to a directive to delete a file satisfying a predetermined condition from an application, and includes: a step of obtaining in primary storage from an actual data area in secondary storage the directory entry information in a directory storing a file to be deleted; a step of adding in the primary storage a delete mark to the file in the obtained directory entry when the file in the obtained directory entry satisfies the predetermined condition; a step of writing a result of the delete mark adding process to a corresponding portion of the actual data area in the secondary storage; and a step of freeing FAT information stored in the secondary storage corresponding to the delete mark added file.

22 Claims, 21 Drawing Sheets

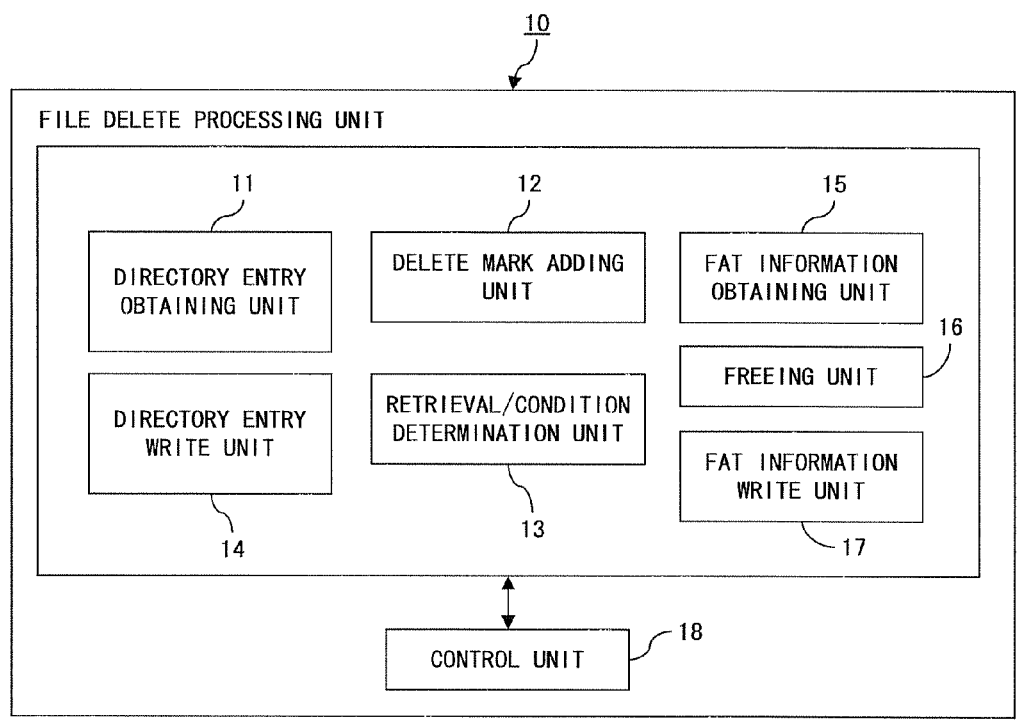
F I G. 1

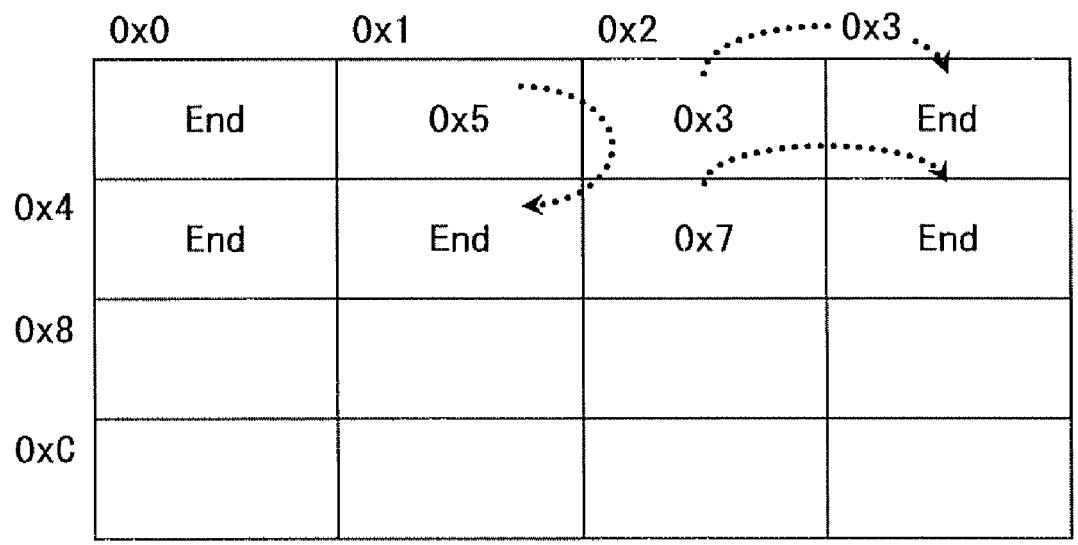
F I G. 4

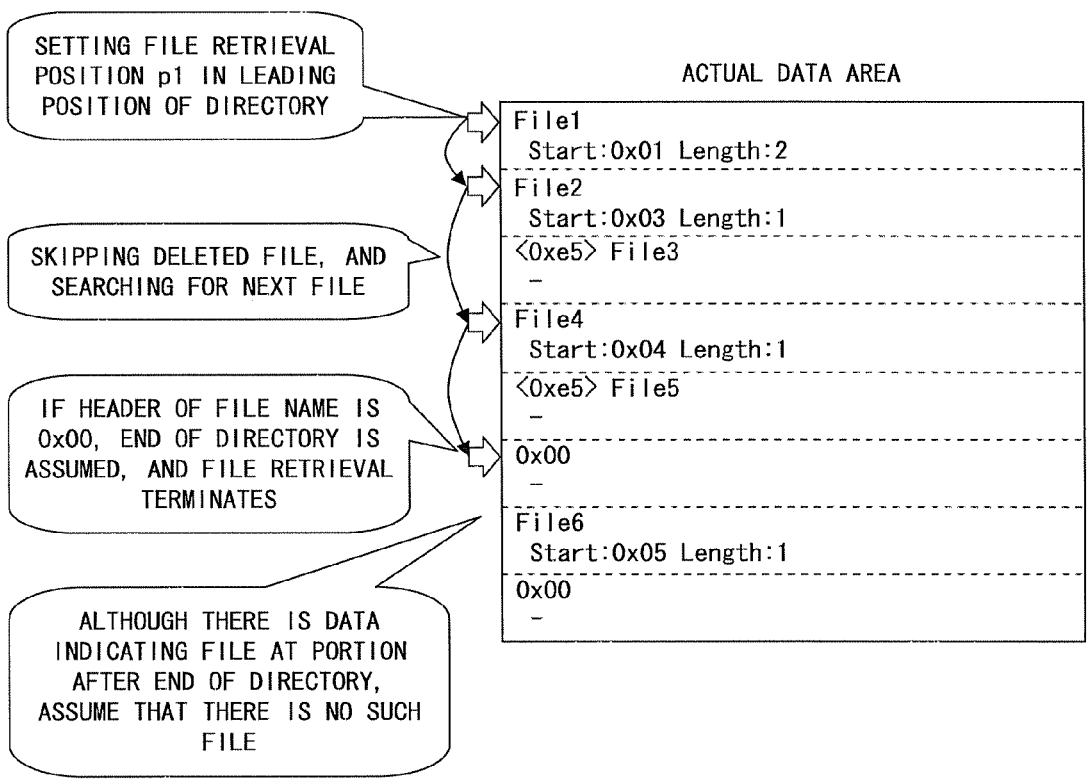
F I G. 6

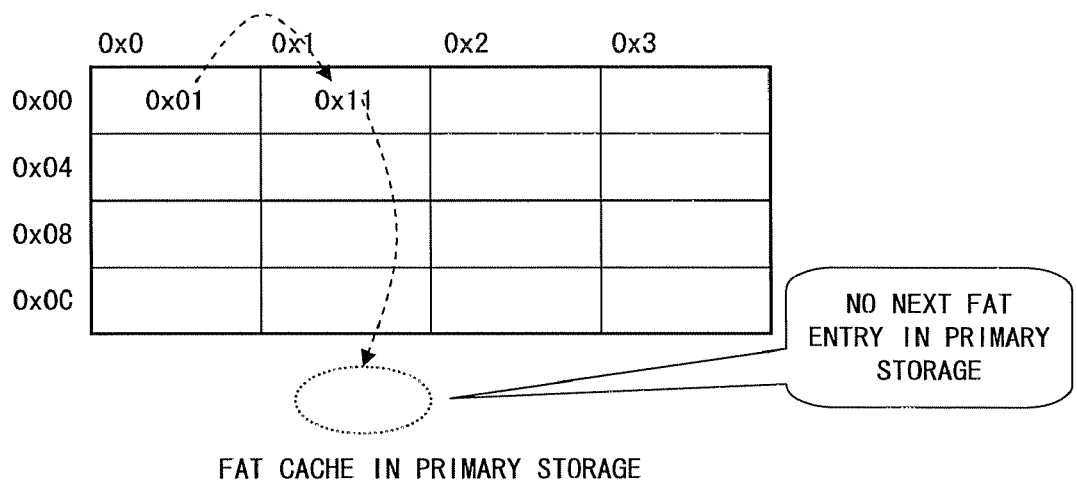
FAT CACHE IN PRIMARY STORAGE
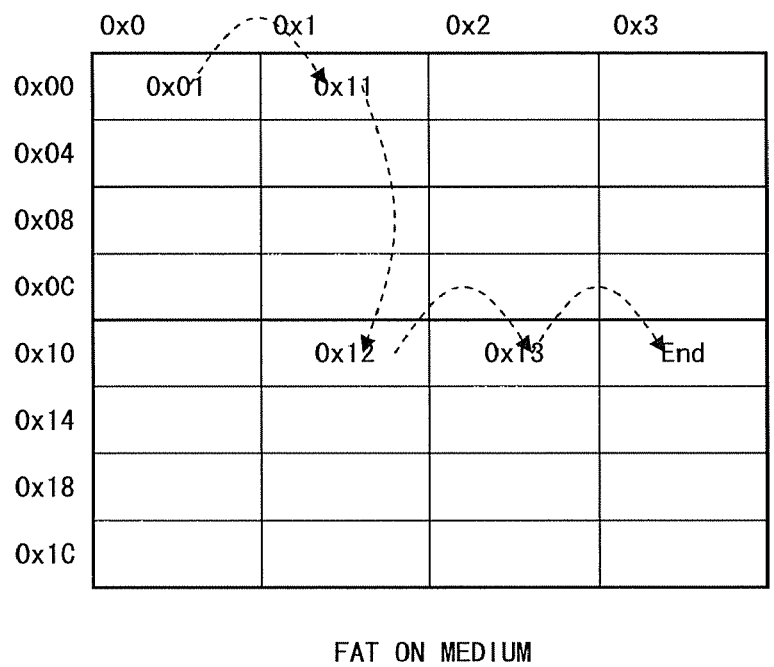
FAT ON MEDIUM
F I G. 8 A

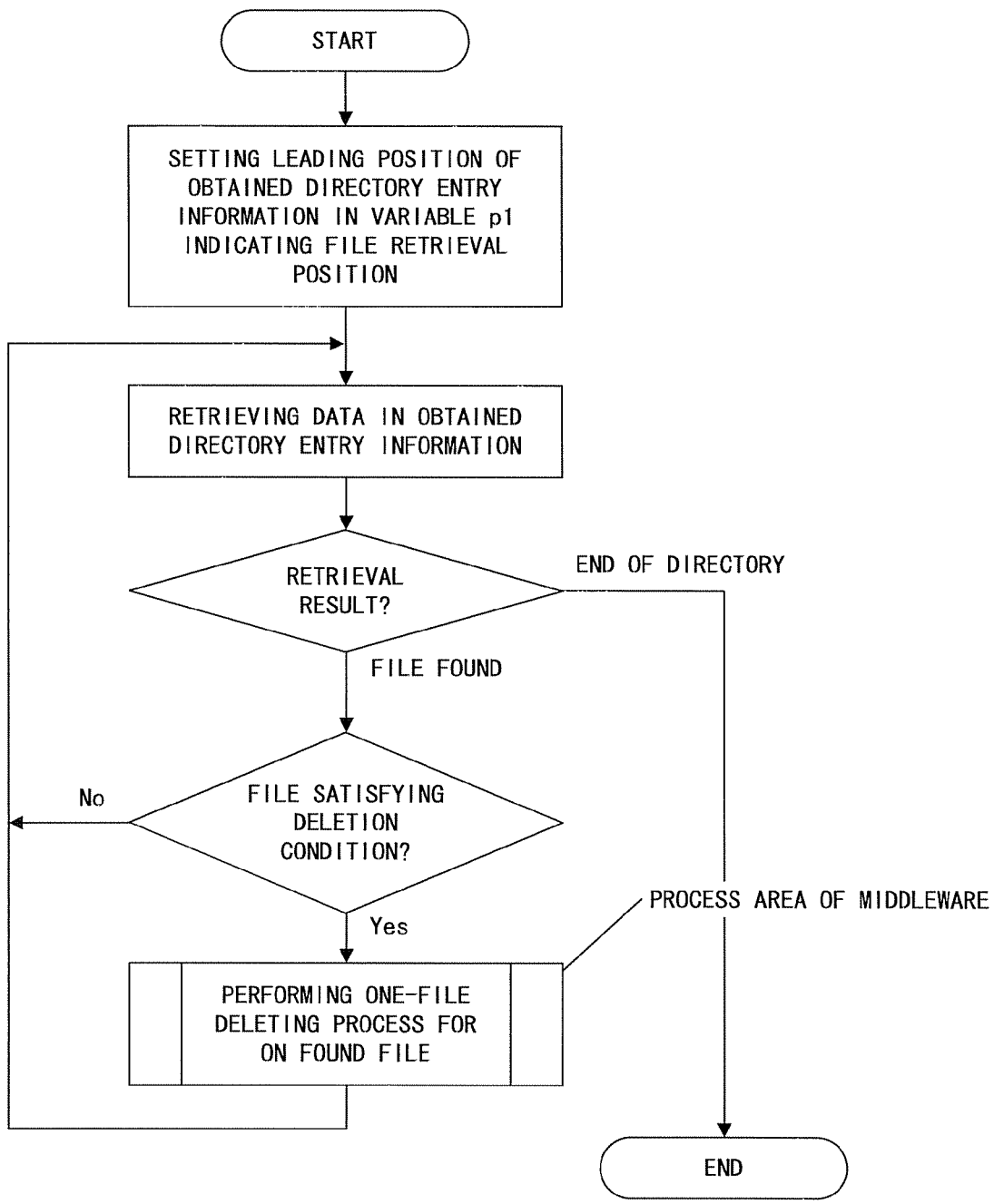
F I G. 9A

|  | SECOND MODE FOR EMBODYING THE PRESENT INVENTION | FIRST MODE FOR EMBODYING THE PRESENT INVENTION | HIGH-SPEED RATE |
|---|---|---|---|
| FILE RETRIEVAL TIME (NECESSARY PROCESS FOR OPEN AND DELETE) | PERFORMING RETRIEVING PROCESS AT FREQUENCY PROPORTIONAL TO SQUARE OF NUMBER OF FILES (200000000 TIMES, 30 MINUTES *1) | PERFORMING RETRIEVING PROCESS AT FREQUENCY PROPORTIONAL TO NUMBER OF FILES (20000 TIMES, 1 SECOND *1) | ABOUT 10000 TIMES (*1) |
| FILE DELETE TIME (NECESSARY PROCESS ONLY FOR DELETE) | PERFORMING DELETING OPERATION AT FREQUENCY EQUAL TO NUMBER OF FILES (20000 TIMES, 3 MINUTES, *1, *2) | PERFORMING DELETING OPERATION AT 1/500 FREQUENCY OF NUMBER OF FILES (40 TIMES, 1 SECOND, *1, *2) | ABOUT 500 TIMES (*2) |

*1 WHEN NUMBER OF FILES IS 20000

*2 USING FLASH MEMORY AS RECORDING MEDIUM, AND DELETE UNIT (CLUSTER) SIZE OF FLACH MEMORY IS 16KB

FIG. 11

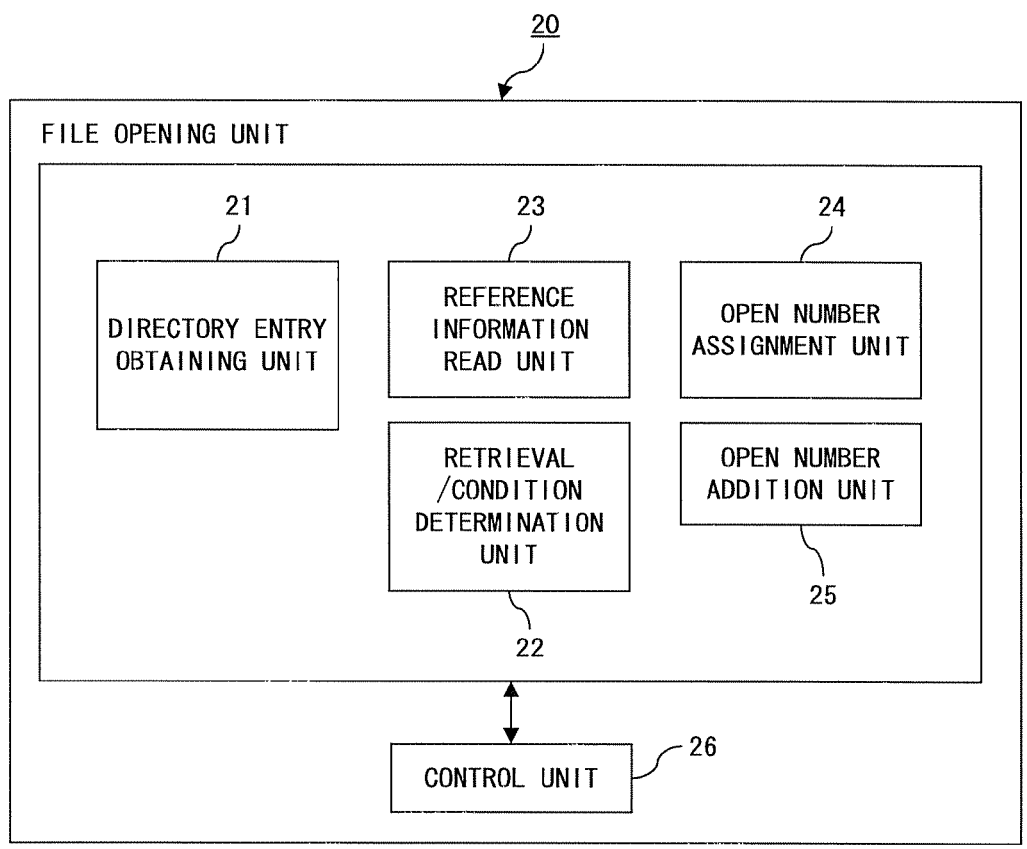
F I G. 12

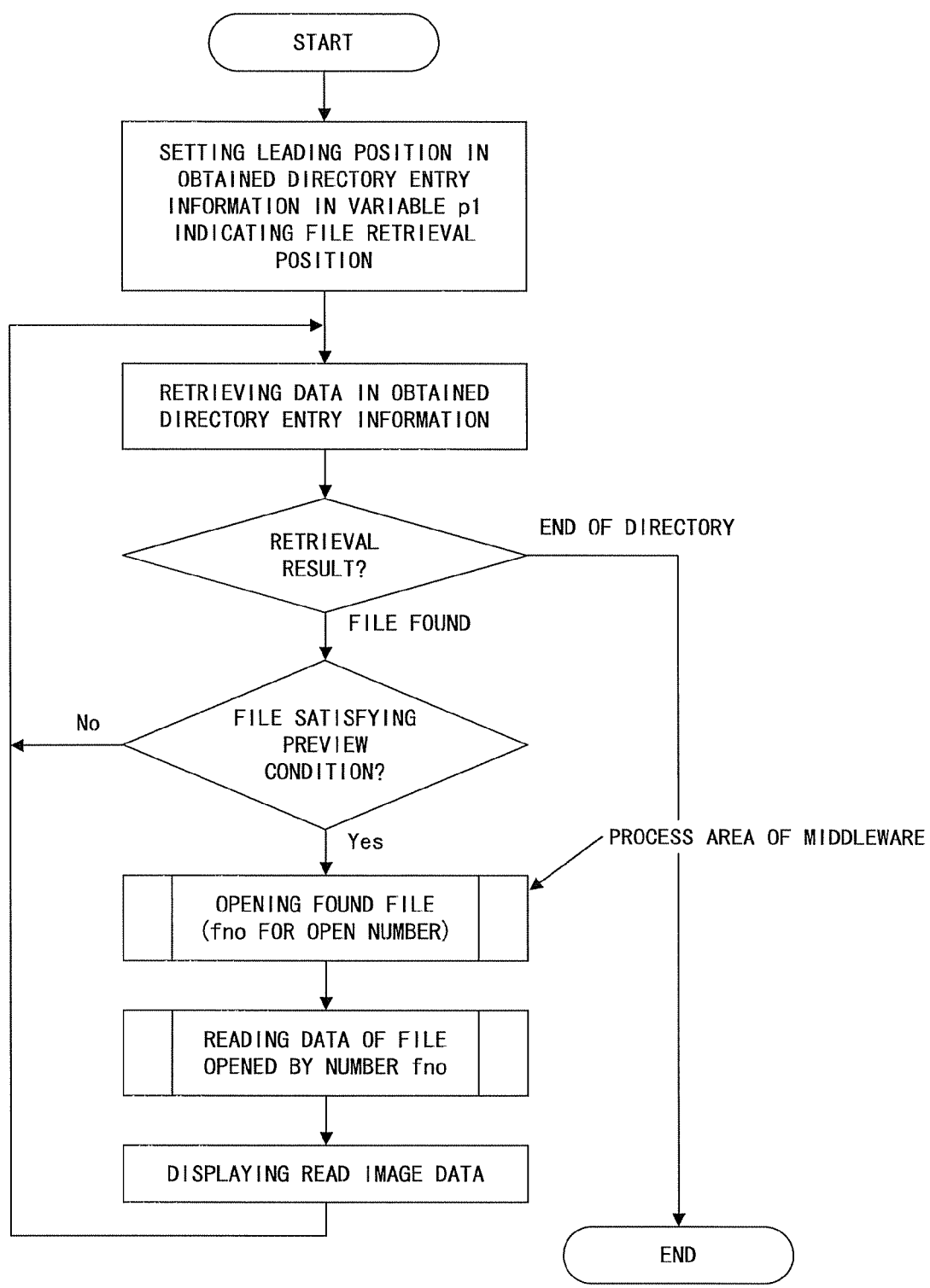
F I G. 14 A

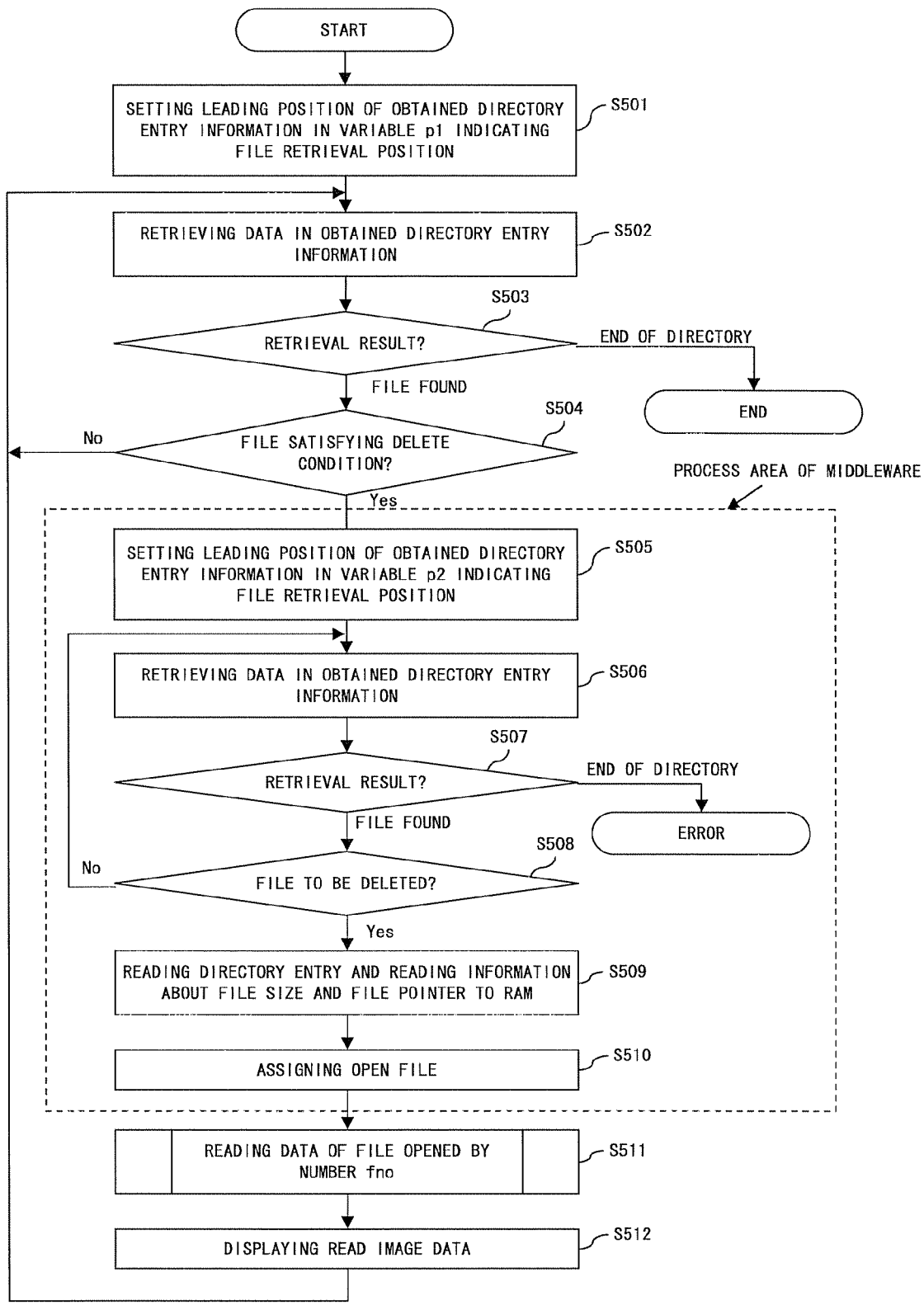
F I G. 15

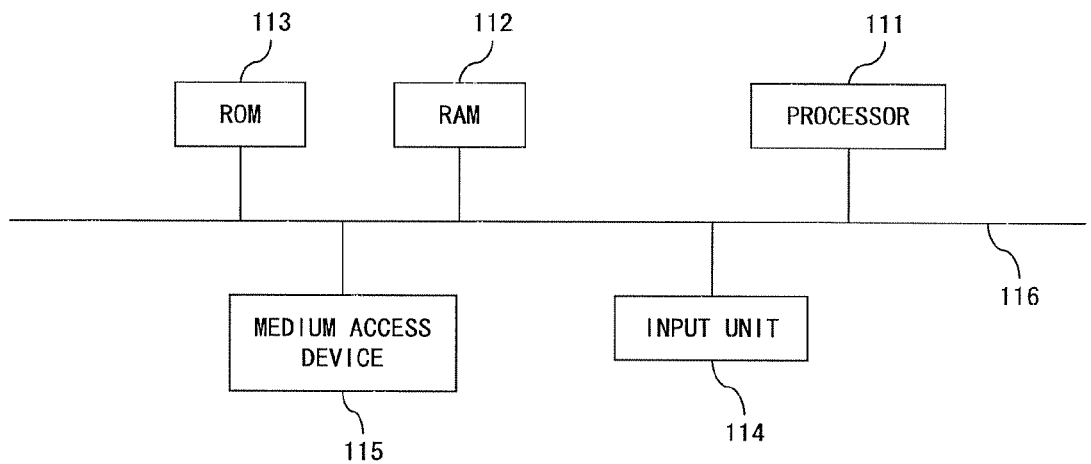
F I G. 17

FILE DELETE METHOD, FILE OPEN METHOD, STORAGE MEDIUM STORING FILE DELETE PROGRAM, AND STORAGE MEDIUM STORING FILE OPEN PROGRAM

CROSS-REFERENCE TO RELATED APPLICATIONS

This application is based upon and claims the benefit of priority from the prior Japanese Patent Application No. 2006-003348 filed on Jan. 11, 2006, the entire contents of which are incorporated herein by reference.

BACKGROUND OF THE INVENTION

1. Field of the Invention

The present invention relates to a file delete method and a file open method, and more specifically to a file delete method used with a condition specified and a file open method as preprocessing of file processing (for example, a file preview process) performed with a condition specified.

2. Description of the Related Art

There is a FAT file system as one of the middleware provided between an application and a device driver. For example, the non-patent document 1 describes processes such as a process of reading a directory entry in the FAT file system, etc. There also is the non-patent document 2 as a specification of a FAT file system. A FAT is short for file allocation tables, and a FAT file system refers to a file system used by the OS of Microsoft such as MS-DOS, Windows (registered trademark), etc.

For example, a digital camera has been able to store an image file of several tens of thousands of orders in the storage medium having a greatly increasing amount of capability of a storage medium (also referred to as secondary storage). Correspondingly, it has become necessary to have a digital camera having the function of reading an image having a specific condition to the storage medium, smoothly previewing the image, and deleting an image which is stored in the storage medium and has a specific condition.

[Non-patent Document 1] "Practical Study of Demanded File System", Interface, July 2001, pp 55-134

[Non-patent Document 2] "Microsoft Extensible Firmware Initiative FAT 32 File System Specification", Hardware White Paper, Microsoft Corporation However, in the above-mentioned FAT file system, when an image file is opened as preprocessing of image preview, or a file is deleted in the file delete process, the contents of a directory are sequentially searched to designate the position of a file. Therefore, when there are a large number of files to be processed, the searching time in the directory greatly increases.

SUMMARY OF THE INVENTION

The first object of the present invention is to provide a file delete method and a file delete program capable of quickly performing a deleting process when a file satisfying a predetermined condition is to be deleted.

The second object of the present invention is to provide a file open method and a file open program capable of quickly performing a predetermined process when the predetermined process is performed by opening the file.

The file delete method according to the first aspect of the present invention is used by a computer performing the process of outputting to a device driver side a directive corresponding to a directive to delete a file satisfying a predetermined condition from an application, and includes: a directory entry obtaining step of obtaining in primary storage from an actual data area in secondary storage one cluster of directory entry information in a directory storing a file to be deleted; a delete mark adding step of adding in the primary storage a delete mark to the file in the obtained directory entry when the file in the obtained directory entry satisfies the predetermined condition and is to be deleted; a freeing step of freeing the FAT information stored in the FAT in the secondary storage corresponding to the file to which the delete mark is added; and a directory entry writing step of writing the contents of the directory entry in the primary storage to a corresponding portion in the actual data area in the secondary storage when the delete mark adding step is performed on all files in the obtained directory entry.

By performing the file delete process as a function unit of a file system, not as an application, with a condition specified, the exclusive control not to allow other tasks to use the device driver during the execution of the function unit can be set for the function unit. Therefore, the double retrieval loop of the directory entry information about the directory storing the file to be deleted during the process performed when the file delete process is performed as an application with the condition specified can be avoided. As a result, as compared with the conventional process, the time required to perform the retrieving process during the file delete process can be shortened, thereby performing the file delete process with the condition specified at a high speed.

Furthermore, since the directory entry information is written to the secondary storage only when the delete mark adding step is performed for all file(s) in the obtained directory entry, the writing time of the delete information to the secondary storage during the file delete process can be shorter when equal writing time is required for one file of entry information and one cluster of entry information as the directory storing the file to be deleted is stored in the storage medium on which data is read and written in a cluster unit of flash memory, etc. than in the conventional process where information is written to the secondary storage each time the delete mark is added to the entry information about each file, thereby performing the file delete process with the condition specified at a high speed.

The file delete method according to the second aspect of the present invention is used by a computer performing the process of outputting to a device driver side a directive corresponding to a directive to delete a file satisfying a predetermined condition from an application, and includes: a directory entry obtaining step of obtaining, in primary storage from an actual data area in secondary storage, directory entry information in a directory storing a file to be deleted; a delete mark adding step of adding in the primary storage a delete mark to the file in the obtained directory entry when the file in the obtained directory entry satisfies the predetermined condition and is to be deleted; a directory entry writing step of writing a process result of the delete mark adding step to the corresponding portion of the actual data area in the secondary storage; and a freeing step of freeing the FAT information stored in the FAT in the secondary storage corresponding to the file to which the delete mark is added.

By performing the file delete process as a function unit of a file system, not as an application, with a condition specified, the exclusive control not to allow other tasks to use the device driver during the execution of the function unit can be set for the function unit. Therefore, the double retrieval loop of the directory entry information about the directory storing the file to be deleted during the process performed when the file delete process is performed as an application with the condition specified can be avoided. As a result, as compared with the conventional process, the time required to perform the retrieving process during the file delete process can be shortened, thereby performing the file delete process with the condition specified at a high speed.

The file open method according to the third aspect of the present invention is used by a computer performing, based on a directive to perform a predetermined process on a file satisfying a predetermined condition from a first application, the process of outputting the information about a file opened in a second application in which the predetermined process is performed, and includes: a directory entry obtaining step of obtaining, in primary storage from an actual data area in secondary storage, directory entry information in a directory storing a file to be processed; a reference information read step of reading to the primary storage a file size and a file pointer of the file in the obtained directory entry when the file in the obtained directory entry satisfies the predetermined condition and is to be processed; an open number assignment step of assigning an open number to the read file size and file pointer; an open number adding step of adding to an open file list in the primary storage an open number to which the file size and the file pointer are assigned; and a process result outputting step of outputting the open file list to the second application when the reference information read step, the open number assignment step, and the open number adding step are performed on all files in the obtained directory entry.

By performing the process of opening the file satisfying a condition during the file processing performed with the condition specified as a function unit of a file system instead of calling from an application, the exclusive control not to allow other tasks to use the device driver during the execution of the function unit can be set for the function unit. Therefore, the double retrieval loop of the directory entry information about the directory storing the file to be processed during the process performed when the file processing is performed as an application with the condition specified can be avoided. As a result, as compared with the conventional process, the time required to perform the retrieving process during the file process can be shortened, thereby performing the file process with the condition specified at a high speed.

The file processing performed with a condition specified is any process performed with a file satisfying the condition kept open, and can be a file preview process, a data write process to a file satisfying an open condition, a data read process from a file satisfying an open condition, etc.

According to the present invention, when a file satisfying a predetermined condition is deleted, the deleting process can be performed at a high speed.

Also according to the present invention, a file satisfying a predetermined condition can be opened, and when a predetermined process is performed on the file, the predetermined process can be performed at a high speed.

BRIEF DESCRIPTION OF THE DRAWINGS

FIG. 1 is a block diagram of the configuration of the file delete processing unit according to the first mode for embodying the present invention;

FIG. 4 shows the configuration of the data of the FAT in the secondary storage corresponding to the actual data area shown in FIG. 3;

FIG. 6 shows an example of one cluster of the directory entry information read to the primary storage;

FIG. 8A is an explanatory view (1) of the FAT information obtaining process from the secondary storage;

FIG. 9A is a flowchart (1) of the file delete process according to the second mode for embodying the present invention;

FIG. 11 shows the comparison of the simulation results between the first and second modes for embodying the present invention;

FIG. 12 is a block diagram of the condition of the file opening unit according to the third mode for embodying the present invention;

FIG. 14A is a flowchart (1) of the file preview process according to the fourth mode for embodying the present invention;

FIG. 15 is a flowchart (2) of the file preview process according to the fourth mode for embodying the present invention;

FIG. 17 shows the hardware environment (2) when each mode for embodying the present invention is realized by a program.

DETAILED DESCRIPTION OF THE PREFERRED EMBODIMENTS

Figure 2:
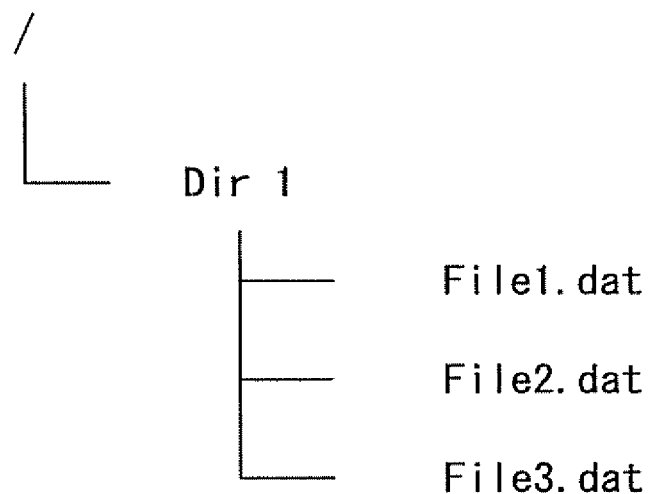
FIG. 2 shows an example of a directory in the secondary storage of the hardware on which the file delete processing unit according to the first mode for embodying the present invention is installed.

The modes for embodying the present invention are explained below in detail by referring to the attached drawings.

FIG. 1 is a block diagram of the configuration of the file delete processing unit according to the first mode for embodying the present invention.

The file delete processing unit shown in FIG. 1 is a type of middleware, and outputs a directive corresponding to the directive to delete a file satisfying a predetermined condition.

In FIG. 1, a file delete processing unit 10 comprises: a directory entry obtaining unit 11 for obtaining in the primary storage from the actual data area in the secondary storage one cluster of directory entry information about the directory storing the file to be deleted; a retrieval/condition determination unit 13 for searching data in the obtained directory entry information determining whether or not there is a file in the directory entry, and whether or not the file satisfies the predetermined condition if there is the file; a delete mark adding unit 12 for adding a delete mark in the primary storage to the file in the obtained directory entry when the file in the obtained directory entry satisfies the predetermined condition and is to be deleted; each unit (a FAT information obtaining unit 15, a freeing unit 16, and a FAT information write unit 17) for freeing the FAT information stored in the FAT in the secondary storage corresponding to the file to which the delete mark is added; a directory entry write unit 14 for writing the contents of the directory entry in the primary storage to the corresponding portion in the actual data area in the secondary storage when the delete mark adding process is performed on all files in the obtained directory entry; and a control unit 18 for controlling each unit.

The FAT information obtaining unit 15 obtains in the primary storage a predetermined number of items of the FAT information stored in the FAT (file allocation table) in the secondary storage. When the FAT information in the primary storage includes an item specified to be freed, the freeing unit 16 frees the item. When the FAT information in the primary storage does not include an item specified to be freed, the FAT information write unit 17 writes the FAT information in the primary storage to the corresponding portion of the FAT in the secondary storage.

When the directory entry information obtained by the directory entry obtaining unit 11 is to be continued, the control unit 18 restarts the directory entry obtaining unit 11 after the directory entry write unit 14 executes the process of writing the directory entry information, and obtains a cluster holding the subsequent directory entry information. Then, the retrieval/condition determination unit 13, the delete mark adding unit 12, the FAT information obtaining unit 15, the freeing unit 16, the FAT information write unit 17, and the directory entry write unit 14 are activated for the subsequent directory entry.

FIG. 2 shows the configuration of the directory in the secondary storage of the hardware (a personal computer, a digital camera, a voice recorder, etc.) on which the file delete processing unit according to the present mode for embodying the present invention is installed.

In FIG. 2, "/" indicates a root directory. "Dir1" is a directory storing a file to be deleted in the secondary storage of the hardware. In a digital camera, a deleting process can be performed with the range of the numbers of image files specified for a plurality of obtained image files. "Dir1" is, for example, a directory storing the fetched image files. The system of a digital camera grasps the directory storing the image files.

FIG. 2 also shows that the directory ("Dir1") includes three files ("File1.dat", "File2.dat", and "File3.dat").

Figure 3:
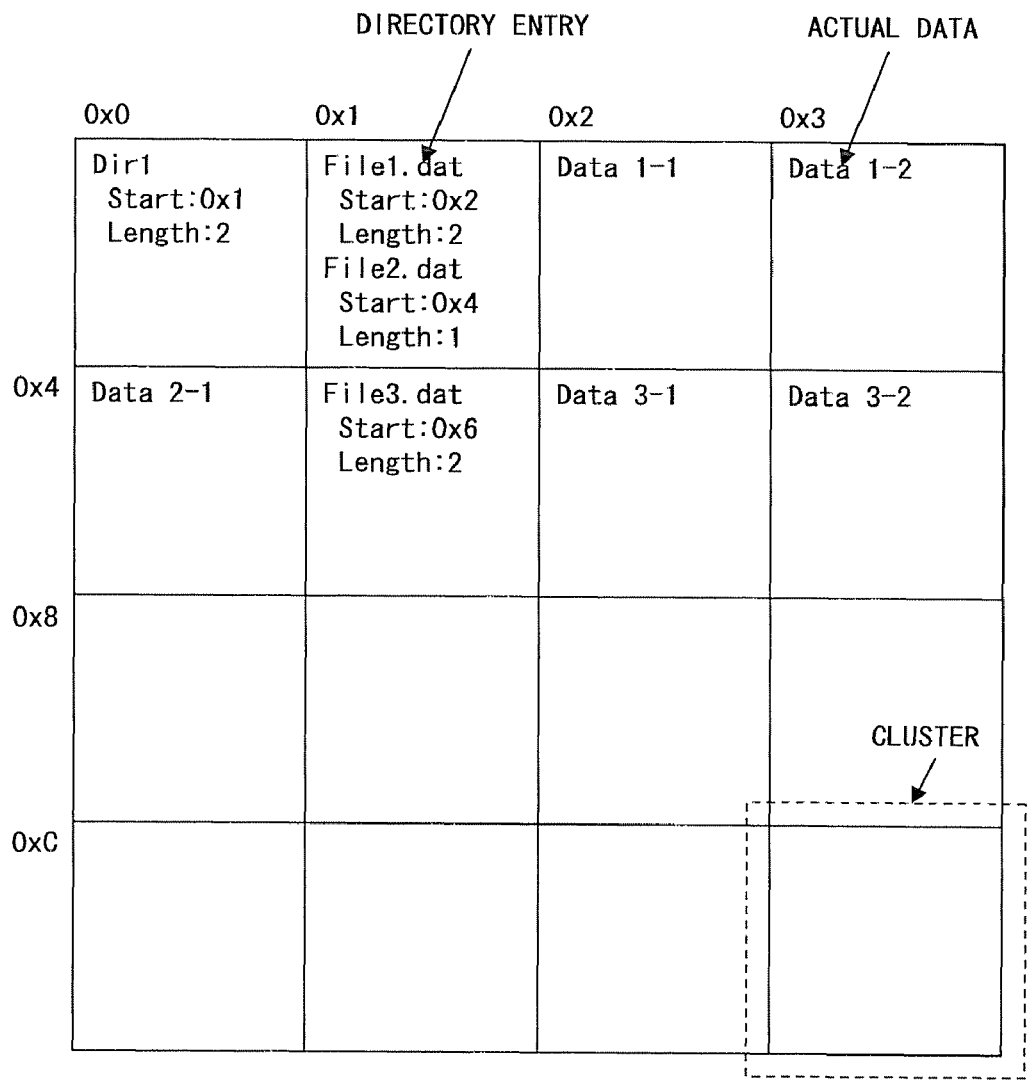
FIG. 3 shows the configuration of the data in the actual data area of the secondary storage on which the file information corresponding to the file information shown in FIG. 2 is stored.

FIG. 3 shows the configuration of the data in the actual data area in the secondary storage storing the file information about the file information shown in FIG. 2.

FIG. 4 shows the configuration of the data of the FAT in the secondary storage corresponding to the actual data area shown in FIG. 3.

For example, the cluster (data process unit) starting with "0×0" shown in FIG. 3 stores the directory entry information about the root directory. By referring to the item of the FAT corresponding to the cluster starting with "0×0" shown in FIG. 3, the pointer information about the item is set as "End". Therefore, the directory entry information about the root directory is completed by the cluster starting with "0×0" shown in FIG. 3.

In addition, according to the information stored in the cluster starting with "0×0" shown in FIG. 3, the directory "Dir1" is stored in the root directory, and the directory entry information about the directory "Dir1" is stored in the cluster starting with "0×1".

When an item of the FAT corresponding to the cluster starting with "0×1" shown in FIG. 3 is referred to in FIG. 4, the pointer information about the item is set to "0×5". Therefore, the directory entry information about the directory "Dir1" is not completed by the cluster starting with "0×1" shown in FIG. 3, and it is also stored in the cluster starting with "0×5" shown in FIG. 3.

When an item of the FAT corresponding to the cluster starting with "0×5" shown in FIG. 3 is referred to in FIG. 4, the pointer information about the item is set to "End". Therefore, the directory entry information about the directory "Dir1" is completed by two clusters, that is, the cluster starting with "0×1" and the cluster starting with "0×5".

According to the information stored in the clusters "0×1" and "0×5" shown in FIG. 3, the directory "Dir1" stores three files "File1.dat", "File2.dat", and "File3.dat", and the data of "File1.dat", "File2.dat", and "File3.dat" are stored in one or more clusters including the clusters respectively starting with "0×2", "0×4", and "0×6".

Furthermore, by referring to the items of the FAT corresponding to the clusters starting with "0×1", "0×4", and "0×6" shown in FIG. 4, the data of "File1.dat" is stored in the clusters starting with "0×2" and "0×3" shown in FIG. 3, the data of "File2.dat" is stored in the cluster starting with "0×4" shown in FIG. 3, and the data of "File3.dat" is stored in the clusters starting with "0×6" and "0×7" shown in FIG. 3.

Figure 5:
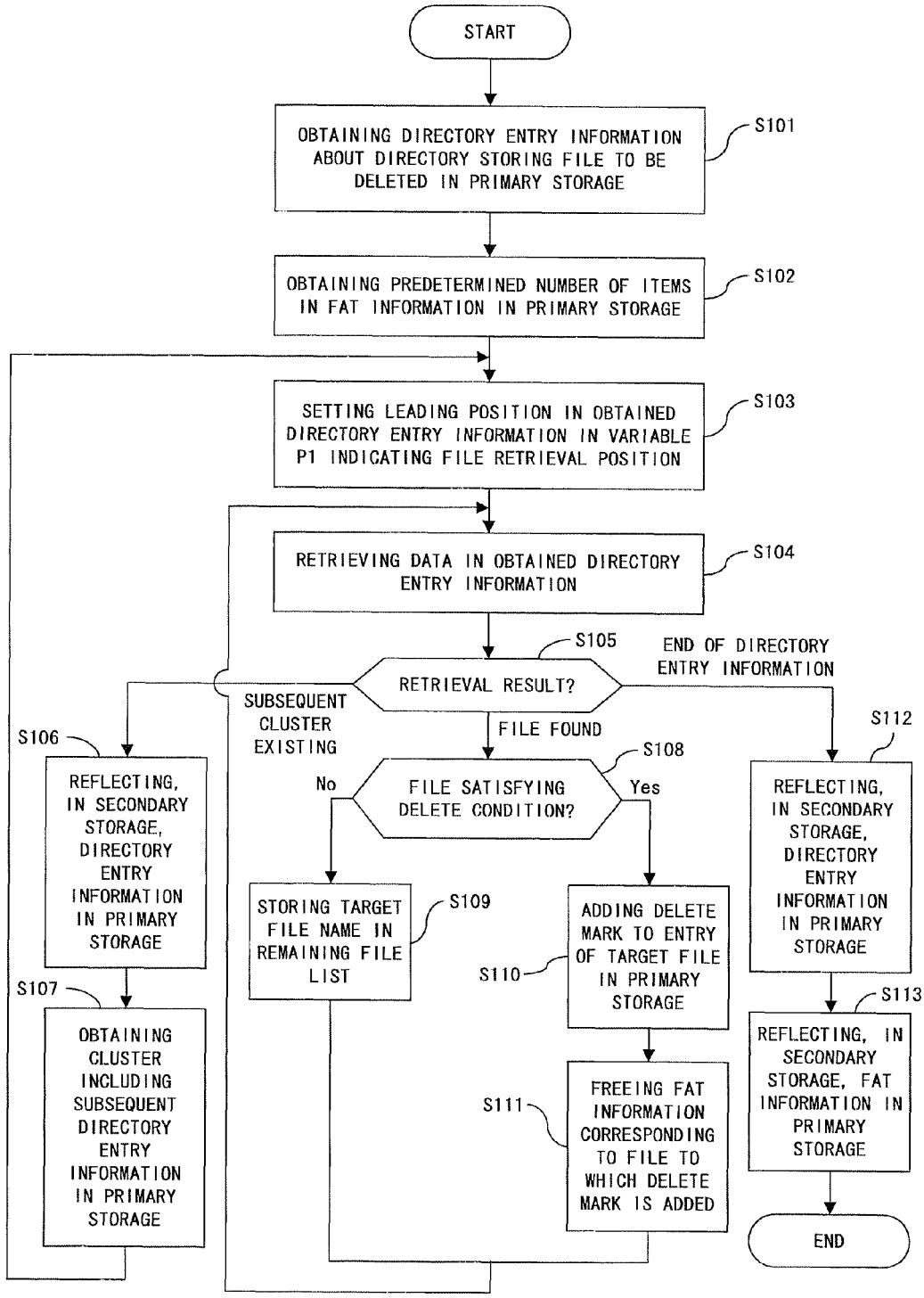
FIG. 5 is a flowchart of the file delete process according to the first mode for embodying the present invention.

FIG. 5 is a flowchart of the file delete process. The process is performed by the file delete processing unit shown in FIG. 1.

A series of processes are started by the file delete processing unit 10 accepting the condition (to be satisfied by a file to be deleted) specified by the user through an application.

In the flowchart shown in FIG. 5, it is assumed that the directory storing the file to be deleted is stored in the flash memory. As it is well known, in the flash memory, data is read and written for each block to be cleared in accordance with the common standard. The file system is associated with the blocks to be cleared when an actual data area is divided into clusters. Therefore, when the information about one file is changed, one cluster of data having the directory entry information storing the file information is read from the secondary storage to the primary storage, and after the file information is changed in the primary storage, the changed directory entry information is written to the secondary storage for each cluster (in a cluster unit).

When the directory storing the file to be deleted is stored in the secondary storage other than the flash memory, there are no restrictions that a data read from the secondary storage or a data write to the secondary storage is to be performed for each cluster.

First, in step S101, the directory entry information in the directory storing the file to be deleted is obtained by the directory entry obtaining unit 11 from the secondary storage to the primary storage. When directory storing the file is on the flash memory, the directory entry information is obtained for each cluster.

In step S102, a predetermined number of items of the FAT information corresponding to the actual data area containing the cluster obtained in step S101 is obtained by the FAT information obtaining unit 15. For example, the FAT information obtaining unit 15 obtains a predetermined number of items of the FAT information including the items of the FAT corresponding to the cluster obtained in step S101.

Then, in step S103, the retrieval/condition determination unit 13 sets the leading retrieval position in the directory entry information obtained in step S101 to the variable p1 indicating the file retrieval position.

In step S104, the retrieval/condition determination unit 13 searches the data in the obtained directory entry information, and determines whether or not there is a file in the directory entry, and whether or not, if a file is detected, the file satisfies the condition of the file to be deleted.

In step S105, a retrieval result acquired by the retrieval/condition determination unit 13 in step S104 is obtained. The retrieval result is classified into three cases, that is, the case where the retrieval of one cluster of information obtained in the directory entry information is completed, but the directory entry information includes the subsequent information in the subsequent clusters, the case where a file is found, and the case where the end of the directory entry information is reached.

FIG. 6 shows an example of one cluster of directory entry information read to the primary storage. The retrieving process by the retrieval/condition determination unit 13 is practically explained by referring to FIG. 6.

First, in FIG. 6, "File1", "File2", "<0xe5>File3", "File4", "<0xe5>File5", "0x00", "File6", and "0x00" are information stored in the respective file retrieval positions. Each of them indicates a file name. "<0xe5>" corresponds to the "0xe5" of a character code, and is a delete mark defined in the standard. The file having the file name to the head of which the delete mark is added has already been deleted.

The retrieval/condition determination unit 13 passes control to the next retrieval position when there is a file at the current retrieval position to which the delete mark has already been added.

"0x00" corresponds to the "0x00"th character code, and is a code indicating the end of the directory entry information prescribed in the standard. When there is a code ("0x00") indicating the end of the directory entry information at the current retrieval position, the retrieval/condition determination unit 13 assumes that the current retrieval position is the end of the directory entry information. As shown in FIG. 6, although there is the information indicating a file ("File6") at the position after the end of the directory, it is assumed that the file is not present.

If there is no "0x00" at the retrieval position before the end of the obtained directory entry information in the cluster, then there is the possibility that the subsequent directory entry information is stored in another cluster. In this case, the retrieval/condition determination unit 13 refers to the item of the FAT corresponding to the obtained directory entry information, and determines the presence/absence of the subsequent directory entry information.

For example, when a file delete process is performed on the data shown in FIGS. 2, 3, and 4, the information in the cluster starting with "0x1" shown in FIG. 3 is obtained as the directory entry information about the directory "Dir1" storing the file to be deleted. The pointer information about the item (starting with "0x1" shown in FIG. 4) of the FAT information corresponding to the cluster starting with "0x1" shown in FIG. 3 is set to "0x5". In this case, the cluster starting with "0x5" shown in FIG. 3 is the subsequent cluster of the cluster starting with "0x1".

The flowchart shown in FIG. 5 is explained again.

In step S105, if the retrieval/condition determination unit 13 determines that the directory entry information includes the subsequent information in the subsequent cluster, then the directory entry write unit 14 is activated in step S106, and the directory entry write unit 14 writes the directory entry information (one cluster of information) for which the retrieval is completed from the primary storage to the secondary storage (storage medium).

Then, in step S107, the subsequent directory entry information (one cluster of information) is obtained by the directory entry obtaining unit 11 from the secondary storage to the primary storage, and control is returned to step S103. In step S103, the leading position in the subsequent directory entry information is set in the variable p1 indicating the file retrieval position.

When the storage medium for which it is not necessary to write data for each cluster is used as a secondary storage, it is not necessary to perform the write process in step S106 and the read process in step S107 for each cluster.

If the retrieval/condition determination unit 13 determines in step S105 that a file has been found, then the retrieval/condition determination unit 13 determines whether or not the found file satisfies the condition to be satisfied by a file to be deleted.

If it is determined in step S108 that the found file does not satisfy the condition to be satisfied by a file to be deleted, then the remaining file list stores the file name is step S109, control is returned to step S104, the next retrieval position is set in the variable p1, and the retrieval is continued. The remaining file list refers to a list of file names of files remaining in the target directory as a result of the deleting process. The file name stored in the remaining file list is a file name of a file not satisfying the condition to be satisfied by a file to be deleted, or a file name of a file whose file attribute is "read only" or "write protect" and satisfying the condition. Based on the remaining file list, the application for performing the deleting process retrieves one file name from the remaining file list and displays it. The user refers to the file name, and instructs the application to or not to delete the file name.

If it is determined in step S108 that the found file satisfies the condition to be satisfied by a file to be deleted, then the delete mark adding unit 12 adds the information indicating the deletion (delete mark) to the leading position of the file name in step S110. The process of adding the delete mark is performed in the primary storage. Then, in step S111, the FAT information obtaining unit 15, the freeing unit 16, and the FAT information write unit 17 free the items of the FAT in the secondary storage corresponding to the file to which the delete mark is added. Back in step S104, the next retrieval position is set in the variable p1, and the registration is continued.

When the retrieval/condition determination unit 13 determines in step S105 that the end of the directory entry information is reached, the directory entry write unit 14 is activated in step S112, and the directory entry write unit 14 writes to the secondary storage (storage medium) the directory entry information currently in the primary storage, thereby terminating the series of processes.

Figure 7:
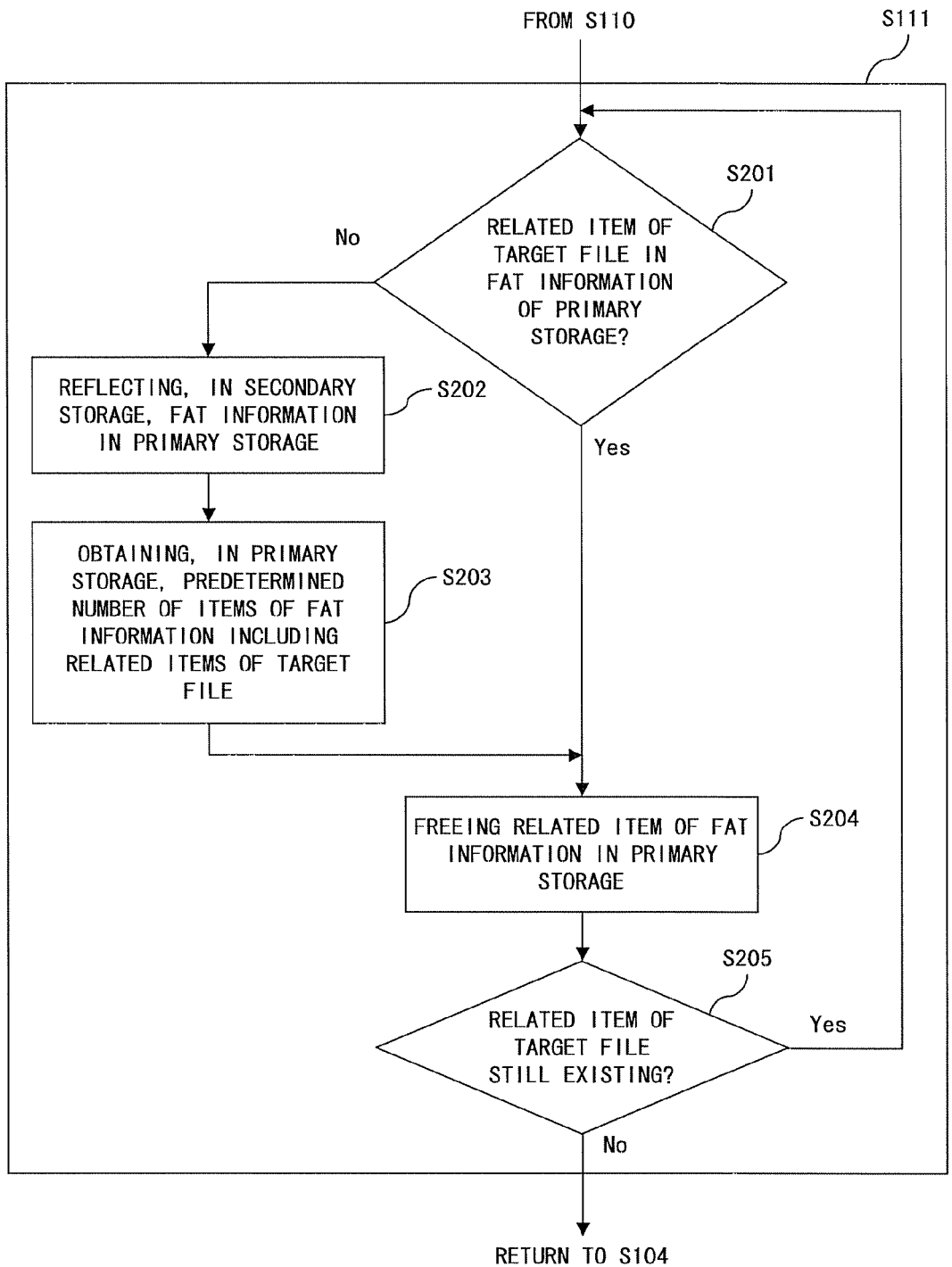
FIG. 7 is a view for detailed explanation of the process of freeing the FAT information about a file to which the delete mark shown in FIG. 5 is added.

FIG. 7 is an explanatory view for detailed explanation of the process (step S111) of freeing the FAT information about the file to which the delete mark shown in FIG. 5 is added.

First in step S201, when the control unit 18 receives from the delete mark adding unit 12 the information that the process of adding the delete mark to a target file has been performed, the control unit 18 retrieves a predetermined number of items of the FAT information already obtained in the primary storage by the FAT information obtaining unit 15, and determines whether or not there is a related item of the target file in the predetermined number of items. A related item refers to an item to be next freed.

If the FAT information about a target file has not been freed, the related item is the leading item of the FAT information about the target file. The leading item can be recognized according to the information described in the directory entry of the target file. When the second or subsequent item of the FAT information about the target file is freed, the related item is recognized according to the pointer information of the last freed item.

If it is determined in step S201 that the related item of the target file is not found in the FAT information in the primary storage, then the control unit 18 activates the FAT information write unit 17 in step S202, and the FAT information write unit 17 writes the FAT information currently in the primary storage to the corresponding portion in the secondary storage.

Then, in step S203, the control unit 18 activates the FAT information obtaining unit 15, and the FAT information obtaining unit 15 obtains a predetermined number of items of the FAT information including the related items of the target file, thereby passing control to step S204.

If it is determined in step S201 that a related item of a target file is in the FAT information in the primary storage, or after performing the process in step S203, control is passed to step S204. In step S204, the freeing unit 16 frees a related item of the FAT information in the primary storage.

In the next step S205, the control unit 18 determines whether or not there is a related item of a target file. In this case, the pointer information about an item freed in step S204 is referenced. When "End" is set in the pointer information, control is returned to step S104 shown in FIG. 5. If a pointer value having the meaning other than the "End" is set in the pointer information, control is returned to step S201, and the control unit 18 determines whether or not the item starting with the pointer value having the meaning other than the "End" is in the FAT information in the primary storage.

If the FAT information corresponding to one file is discontinuously distributed in the items of the FAT, then the frequency of writing in the secondary storage of the FAT information in step S202 and reading the FAT information from the secondary storage in step S203 increases, and it takes a long time in performing a freeing process on the FAT information. By performing the defragmentation process in advance on the actual data area, the data distributed and stored in the discontinuous clusters in the actual data area can be stored in the continuous clusters for each file data in the actual data area, and the item of the corresponding FAT information can be continuously stored in the FAT. Thus, the frequency of reading and writing processes of the FAT information can be reduced, thereby shortening the time required in the process of freeing the FAT information.

For example, in the data shown in FIGS. 2, 3, and 4, assume that the file of "File3.dat" is a file to be deleted, and the FAT information obtaining unit 15 simultaneously obtains four items (each row shown in FIG. 4) of the FAT information.

In this case, after adding the delete mark to the file name "File3.dat", the items (items starting with "0x6" and "0x7" shown in FIG. 4) of the FAT information corresponding to the "File3.dat" are freed. That is, the first item of the FAT information of "File3.dat" is the item starting with "0x6" of the FAT information according to the directory entry information in the cluster starting with "0x5" shown in FIG. 3. In addition, by referring to the pointer information about the item starting with "0x6" about the FAT information, the item of the fain to be next freed is the item starting with "0x7" of the FAT information.

Furthermore, by referring to the pointer information about the item starting with "0x7" of the FAT information, it is clear that there is no item of the FAT information to be freed, thereby terminating the process of freeing the FAT information about the file "File3.dat".

By referring to FIGS. 8A and 8B, the process of obtaining the FAT information from the secondary storage is further described below.

In this explanation, the FAT information obtaining unit 15 simultaneously obtains the 16 items in the FAT information. In the FAT information shown in FIG. 8A, the pointer information about the item of the FAT starting with "0x01" is set to "0x11". When the upper half of the FAT on the storage medium is currently obtained in the primary storage, the items subsequent to the item of the FAT starting with "0x01" are not currently in the primary storage.

Figure 8B:
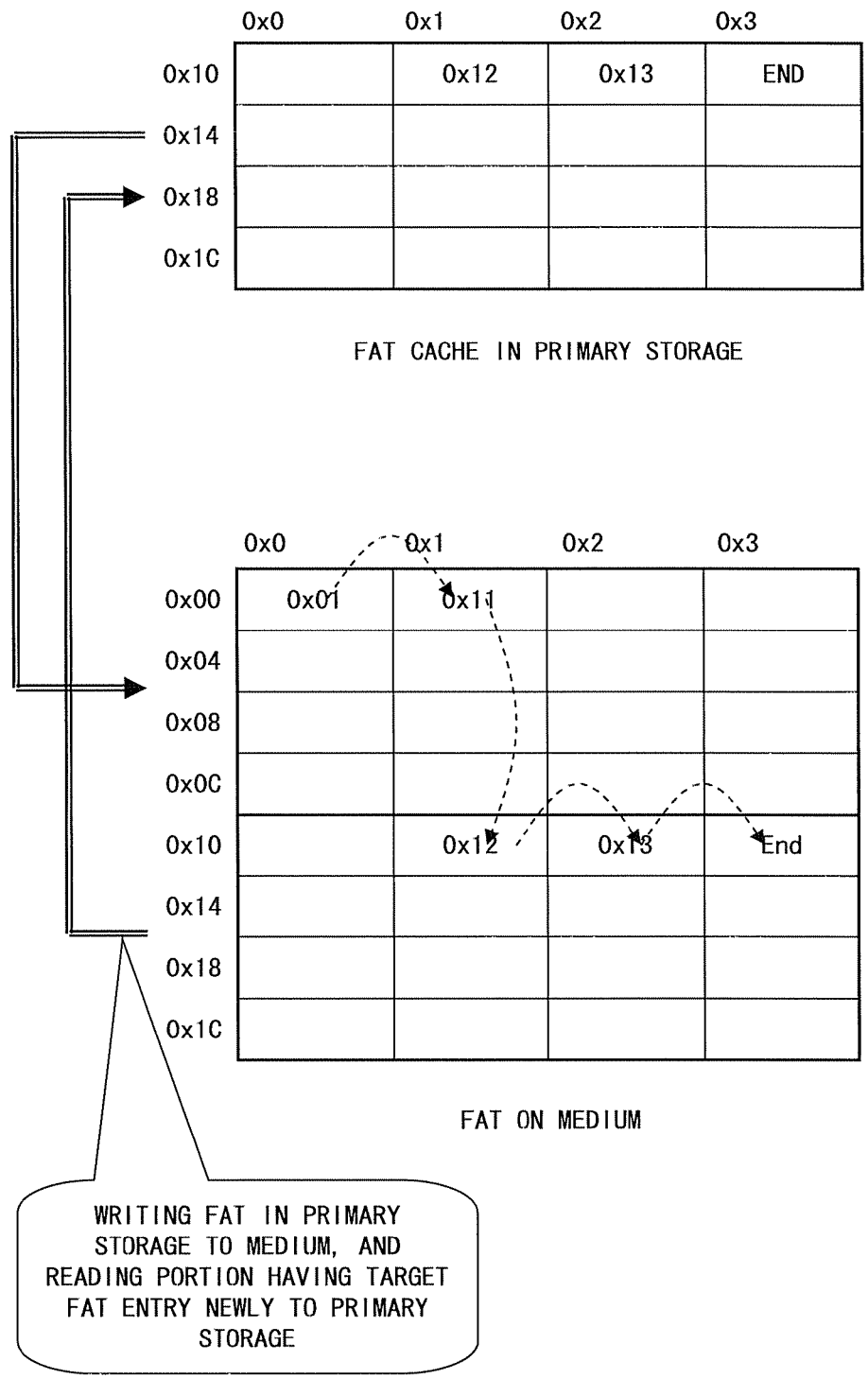
FIG. 8B is an explanatory view (2) of the FAT information obtaining process from the secondary storage.

In this case, as shown in FIG. 8B, the FAT information write unit 17 overwrites the FAT information in the primary storage with the corresponding portion in the storage medium, and the FAT information obtaining unit 15 obtains in the primary storage the lower half of the FAT in the storage medium. Then, the process of freeing the subsequent items of the FAT is performed.

Described below is the file delete process according to the second mode for embodying the present invention.

The concept of the conventional file system is that middleware (file system) is to be implemented using only a basic process on a file as a function unit. Then, the process attained by repeatedly using the basic processes (function units of middleware), the process attained by combining the basic processes, etc. are to be realized by calling the function unit of the middleware.

By applying the conventional concept to the process of deleting a file to be performed with a condition specified, the flowchart of the file delete process according to the second mode for embodying the present invention, that is, the flowchart shown in FIG. 9A can be obtained.

In FIG. 9A, the process of deleting one file (the file delete process for 1 file) is one function unit provided for the file system, and the function unit of the file delete process for one file is called from the application (for performing the process shown in FIG. 9A) for performing the deleting process on the file satisfying a specified condition.

Figure 9B:
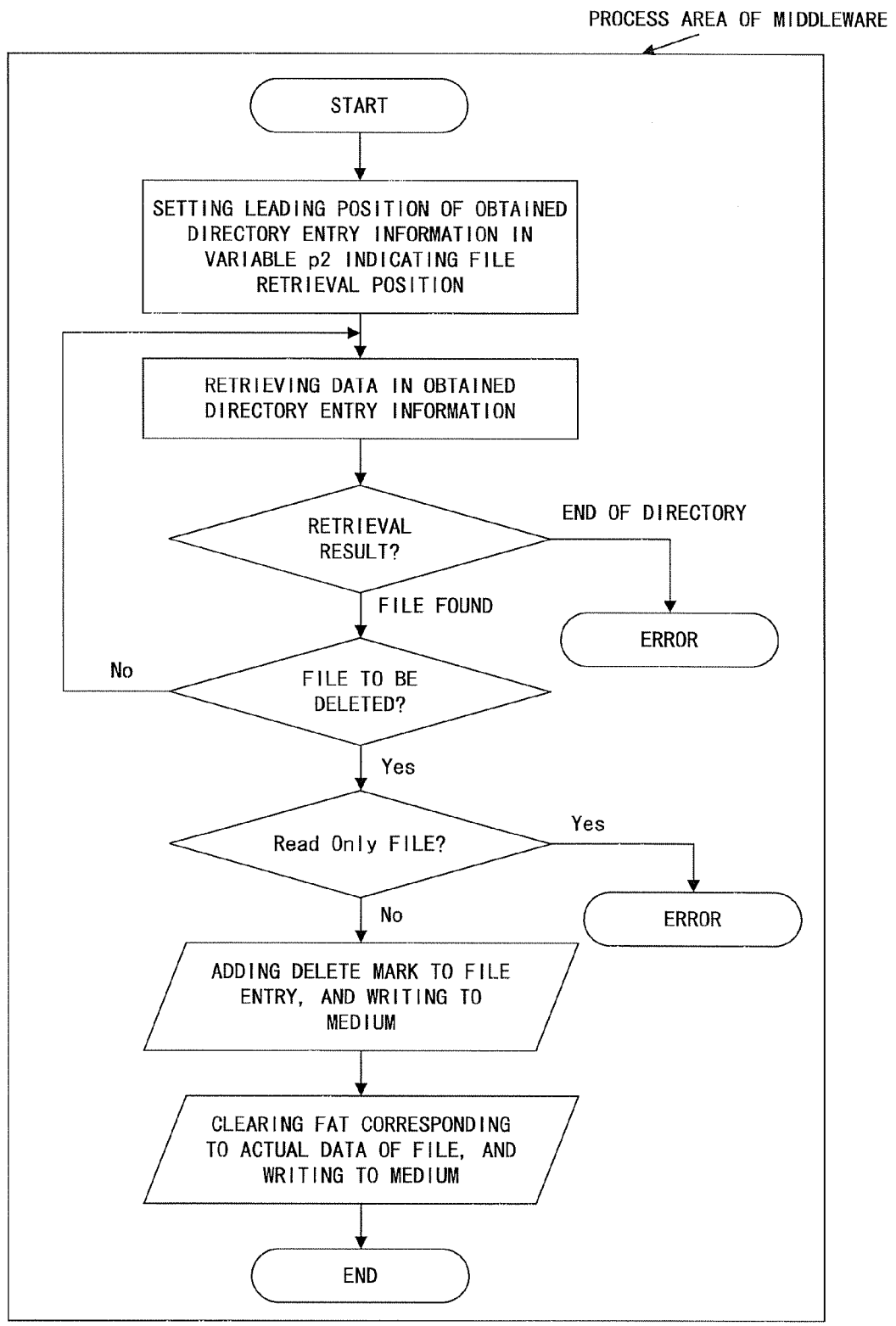
FIG. 9B is a flowchart of the deleting process for one file on which the function unit of the file system is performed.

FIG. 9B is a flowchart of the deleting process for one file. The flowchart shown in FIG. 10 is obtained by combining the flowcharts shown in FIGS. 9A and 9B.

Figure 10:
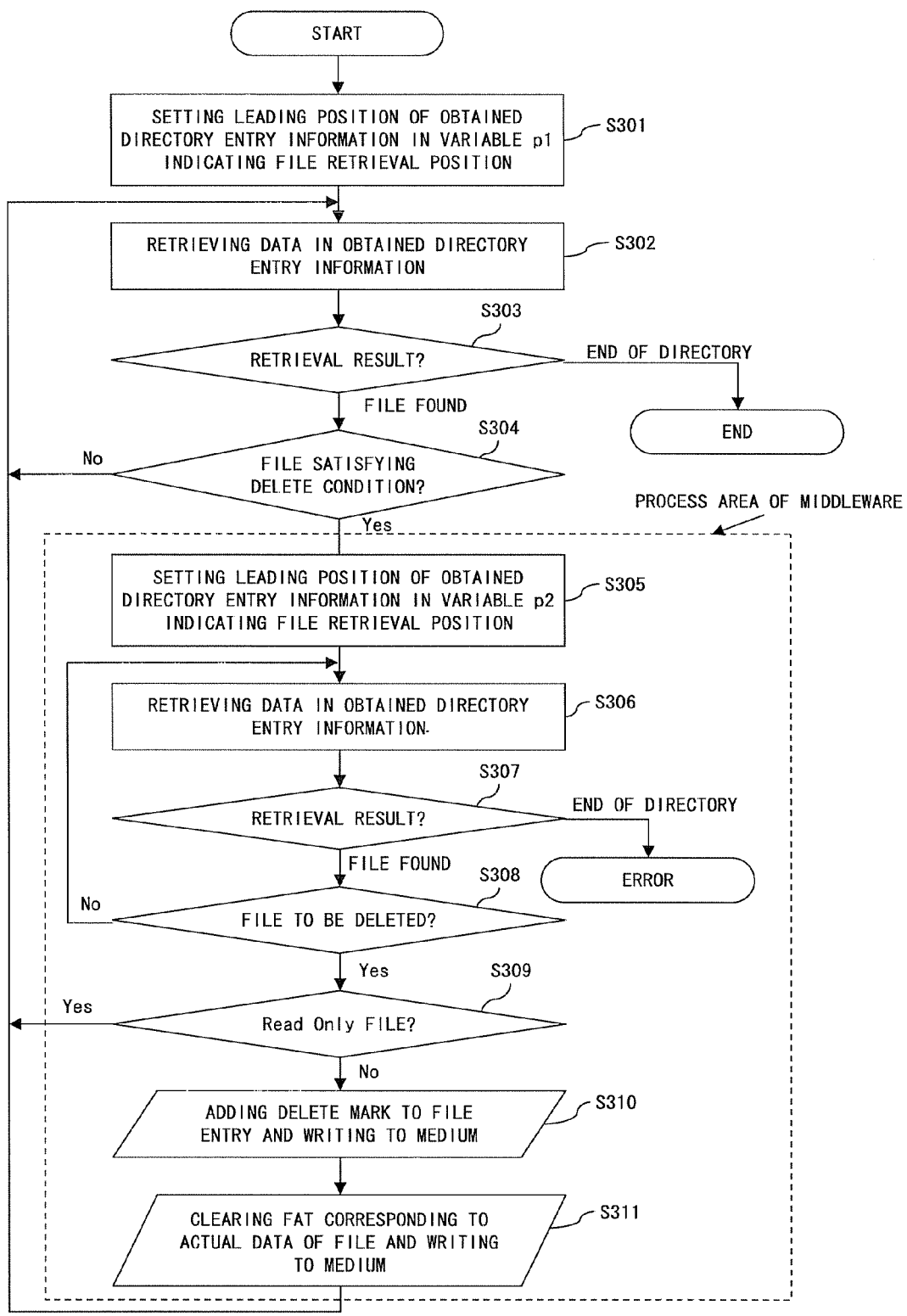
FIG. 10 is a flowchart (2) of the file delete process according to the second mode for embodying the present invention.

The process of the flowchart shown in FIG. 10 is explained below.

First, in step S301, the directory entry information of the directory storing the file to be deleted is obtained from the secondary storage to the primary storage, and the FAT information corresponding to the actual data area including the directory entry information is obtained. The leading retrieval position of the obtained directory entry information is set in the variable p1 indicating the file retrieval position.

In step S302, the data of the obtained directory entry information is retrieved, and it is determined whether or not there is a file in the directory entry information. If YES, it is determined whether or not the file satisfies the condition to be satisfied by the file to be deleted.

In step S303, the retrieval result in step S302 is obtained. The retrieval result is divided into two cases, that is, the case where a file is found, and the case where the end of the directory entry information is reached.

If it is determined in step S303 that the end of the directory entry information is reached, a series of processes are terminated.

If it is determined in step S303 that a file has been found, then it is determined in step S304 whether or not the found file satisfies the condition to be satisfied by the file to be deleted.

In step S304, if it is determined that the found file does not satisfy the condition to be satisfied by a file to be deleted, then control is returned to step S302, and the next retrieval position is set in the variable p1, and the retrieval is continued.

If it is determined in step S304 that the found file satisfies the condition to be satisfied by a file to be deleted, then control is passed to step S305.

In FIG. 10, the processes in steps S305 through S311 are performed by the function unit of middleware.

The flowchart shown in FIG. 10 externally has a retrieval loop for the directory entry information from steps S302 to S311. The retrieval loop includes a retrieval loop of the directory entry information from step S306 to step S308. The retrieval loop of the directory entry information is double, which apparently seems unnatural. However, a user having the knowledge of a file system can understand that the process using such a double loop cannot be avoided.

That is, since the processes in steps S301 through S304 are performed by an application, an occurrence of a defective cluster is detected in the file system while the processes are being performed, and the position of the file in the secondary storage (storage medium) can be rewritten.

In this case, although a file is to be deleted based on the retrieval position set in the variable p1 in step S302, there is the possibility that the information about the retrieval position is different from the directory entry information in the secondary storage at that time. To avoid the inconvenience, a new retrieval loop (a retrieval loop from step S306 to step S308) is provided in a retrieval loop of the directory entry information from step S302 to step S311 as shown in FIG. 10, and it is necessary to perform retrieval according to the latest directory entry information in the inner retrieval loop.

Since the processes in steps S305 through S311 are the processes of the middleware, exclusive control is normally performed on the device driver while the steps are being performed. That is, although the device driver accepts a write request from another task to the secondary storage, a write to the secondary storage at a request from another task is not performed while the processes in steps S305 through S311 are being performed.

Described below are the steps S305 through S311.

First, in step S305, the directory entry information about the directory storing the file to be deleted is obtained again from the secondary storage to the primary storage, and the FAT information corresponding to the actual data area including the directory entry information is obtained. Then, the leading retrieval position in the obtained directory entry information is set in the variable p2 indicating the file retrieval position.

In step S306, the data in the obtained directory entry information is retrieved, and it is determined whether or not there is a file found in the directory entry. If YES, it is determined whether or not the file satisfies the condition to be satisfied by a file to be deleted.

In step S307, the retrieval result in step S306 is obtained. The retrieval result is classified into two cases, that is, the case where a file is found, and a case where the end of directory entry information is reached.

If it is determined in step S307 that the end of the directory entry information is reached, a series of processes abnormally terminate.

If it is determined in step S307 that a file has been found, it is determined in step S308 whether or not the found file satisfies the condition to be satisfied by a file to be deleted.

If it is determined in step S308 that the found file does not satisfy the condition to be satisfied by a file to be deleted, then control is returned to step S306, and the next retrieval position is set in the variable p2, there by continuing the retrieval.

If it is determined in step S308 that the found file satisfies the condition to be satisfied by a file to be deleted, then the attribute of the file is determined in step S309. That is, if it is determined in step S309 that the file has the attribute "read only" or "write protect", then control is returned to step S306, the next retrieval position is set in the variable p2, thereby continuing the retrieval.

If it is determined in step S309 that the found file does not have an attribute "read only" and "write protect", then the information about the deletion (delete mark) is added to the leading position of the file name of the found file, thereby writing the information to the secondary storage.

In step S311, the item of the FAT in the secondary storage corresponding to the file to which the delete mark is added is freed. Then, control is returned to step S302.

The file delete process with the specified condition of the second mode for embodying the present invention is compared with the file delete process with the specified condition of the first mode for embodying the present invention as follows.

First, the file delete process with the specified condition of the first mode for embodying the present invention is a function unit in the file system (middleware). Therefore, during the performance, the exclusive control can be easily performed on the device driver. As a result, in the process according to the first mode for embodying the present invention, it is possible to avoid the double retrieval loop of the directory entry information shown in the flowchart, and the retrieval time as a part of the file delete process can be greatly shortened in comparison with the second mode for embodying the present invention.

The retrieval time is proportional to the square of the number of files in the directory entry to be retrieved in the second mode for embodying the present invention while it is proportional to the number of files in the directory entry in the first mode for embodying the present invention.

FIG. 11A shows a simulation results of the first and second modes for embodying the present invention.

In the simulation, the number of files to be deleted is set to 20,000. In the second mode for embodying the present invention, the frequency of loops of the retrieval loop is the square of the number of files, that is, 200,000,000, and the processing time is 30 minutes. On the other hand, in the first mode for embodying the present invention, the frequency of loops of the retrieval loop is 20,000, and the processing time is 1 sec. That is, the file delete process according to the first mode for embodying the present invention can be realized at about 10,000 times faster than the file delete process according to the second mode for embodying the present invention in the file retrieval step in the file delete process.

Next, assume that there is a storage medium on which data is written and read for each cluster in accordance with a given standard. For example, assume that a directory storing the file to be deleted is provided in flash memory.

In the file delete process according to the first mode for embodying the present invention, the directory entry information is written to the secondary storage only with the timing of completing the delete mark adding process (step S106 shown in FIG. 5) for the directory entry information (one cluster) obtained in the primary storage, and with the timing of completing the delete mark adding process (step S112 shown in FIG. 5) for all directory entry information.

On the other hand, in the file delete process in the second mode for embodying the present invention, the directory entry information is written to the secondary storage each time the retrieval loop of the directory entry information is performed from step S302 to step S311 shown in FIG. 10 (step S310 shown in FIG. 10).

In each of the first and second modes for embodying the present invention, considering one cluster of data is written to the storage medium in one writing operation, the time taken to perform the deleting process can be shorter in the first mode having a lower write frequency for embodying the present invention than in the second mode for embodying the present invention.

FIG. 11B shows the simulation result according to the first and second modes for embodying the present invention.

In the simulation, the number of files to be deleted is 20,000, and the size of one cluster is set to 16 Kbytes. In the standard, the storage space of one file of information is set to 32 bytes. That is, one cluster stores about 500 files of entry information. Therefore, if 20,000 files are stored in the directory storing the file to be deleted, the directory entry information about the directory is stored in 40 clusters.

In the second mode for embodying the present invention, the deleting process is performed the same number of times as the files. That is, the process of writing information indicating the deletion to the secondary storage is performed 20,000 times. The time required to perform the writing operation is 3 minutes. In the first mode for embodying the present invention, since data is written to the secondary storage only when the cluster storing the directory entry information is switched, the writing frequency matches the number of clusters storing the directory entry information, that is, 40 times. That is, the file delete process according to the first mode for embodying the present invention can be read about 500 times faster than in the file delete process according to the second mode for embodying the present invention in the reflection of the file information in the file delete process in the secondary storage.

FIG. 12 is a block diagram of the configuration of the file opening unit according to the third mode for embodying the present invention.

The file opening unit shown in FIG. 12 is a type of middleware. At an instruction to preview a file satisfying a predetermined condition from the first application, an open file list as a list of files satisfying the condition of the preview is output to the second application.

In FIG. 12, a file opening unit 20 comprises: a directory entry obtaining unit 21 for obtaining the directory entry information about a directory storing a file to be processed (for example, a preview target) from an actual data area in the secondary storage to the primary storage; a retrieval/condition determination unit 22 for retrieving data in the obtained directory entry information, determining whether or not there is a file in the directory entry, and determining whether or not the file satisfies the predetermined condition; a reference information read unit 23 for reading a file size and a file pointer of a file in the obtained directory entry in the primary storage when the file in the obtained directory entry satisfies the predetermined condition and is to be processed; an open number assignment unit 24 for assigning an open number to the read file size and the file pointer; an open number addition unit 25 for adding the open number assigned to the file sie and the file pointer to the open file list in the primary storage; and a control unit 26 for controlling the directory entry obtaining unit 21, the retrieval/condition determination unit 22, the reference information read unit 23, the open number assignment unit 24, and the open number addition unit 25, outputting the pointer information indicating the top of the open file list when the reference information read step, the open number assignment step, and the open number adding step are performed on all files in the obtained directory entry, and outputting the information to the calling application. In the third mode for embodying the present invention, the calling application opens the file based on the generated open file list, and displays it on the display unit.

Figure 13:
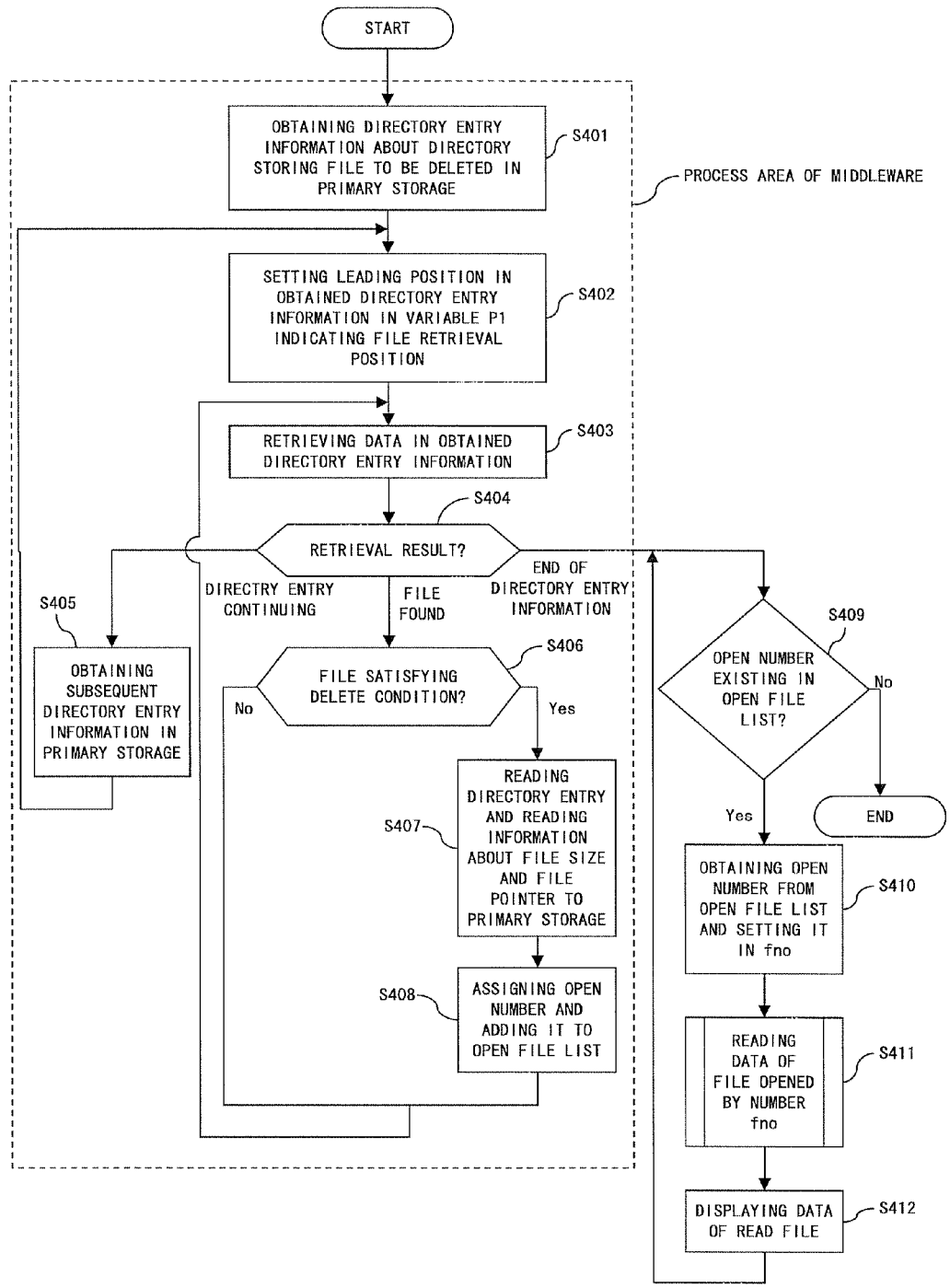
FIG. 13 is a flowchart of the file preview process.

FIG. 13 is a flowchart of the file preview process. The file preview process is divided into the file opening process as a preprocessing of the file preview process and the file preview process performed based on the result of the preprocessing. The file opening process is performed by the file opening unit 20 shown in FIG. 12. The file preview process is performed by an application based on the open file list output as a result of the file opening process.

A series of processes are started by the file opening unit 20 accepting the condition (to be satisfied by a file to be previewed) specified by a user through an application.

First, in step S401, the directory entry information about the directory storing the file to be previewed is obtained by the directory entry obtaining unit 21 from the secondary storage to the primary storage.

In step S402, the retrieval/condition determination unit 22 sets the leading retrieval position in the obtained directory entry information in the variable p1 indicating the file retrieval position.

In step S403, the retrieval/condition determination unit 22 retrieves the data in the obtained directory entry information, determines whether or not there is a file in the directory entry, and, if there is a file, determines whether or not the file satisfies the condition to be satisfied by the file to be previewed.

In step S404, a retrieval result by the retrieval/condition determination unit 22 in step S403 is obtained. The retrieval result is classified into three cases, that is, the case where the directory entry information about the target directory is not completed according to the obtained directory entry information, and the directory entry information is continued, the case where a file is found, and the case where the end of the directory entry information is reached.

If the retrieval/condition determination unit 22 determines in step S404 that the directory entry information is continued, the directory entry obtaining unit 21 overwrites the subsequent directory entry information from the secondary storage to the primary storage in step S405, and control is returned to step S402. In step S402, the leading retrieval position in the subsequent directory entry information is set in the variable p1 indicating the file retrieval position.

If the retrieval/condition determination unit 22 determines in step S404 that a file is found, the retrieval/condition determination unit 22 determines in step S406 whether or not the found file satisfies the condition to be satisfied by a file to be previewed.

In step S406, if it is determined that the found file does not satisfy the condition to be satisfied by a file to be previewed, then control is returned to step S403, the next retrieval position is set in the variable p1, and the retrieval is continued.

If it is determined in step S406 that the found file satisfies the condition to be satisfied by a file to be previewed, then the reference information read unit 23 reads the file size and the file pointer of the found file in the primary storage in step S407. A file pointer refers to a structure at which various types of information about a file are set. In the structure, the information such as the read position when a file is opened, the position in the actual data area storing the data of the file, etc. is set.

In step S408, the open number assignment unit 24 assigns an open number to the read file size, the file pointer, and the open number addition unit 25 adds an open number assigned the file size and the file pointer to the open file list in the primary storage.

The pointer information indicating the top of, for example, a file pointer is set in the open number. Back in step S403, the next retrieval position is set in the variable p1, and the retrieval is continued.

In step S404, when the retrieval/condition determination unit 22 determines that the end of the directory entry information is reached, the file opening process (process of registering a file satisfying a predetermined condition in the open file list) as a function unit of the file system (middleware) terminates. At this time, the pointer information about the open file list is output to the application of the caller from the function unit.

The application which receives the pointer information (open file list) performs the file preview process (steps S409 through S412) based on the open file list.

In step S409, the retrieval position is set in the leading position of the open file list, and it is determined whether or not there is an open number in the retrieval position.

In step S409, when there is no open number in the set position, the series of processes terminate. If there is an open number in the set position in step S409, the open number is retrieved from the open file list in step S410, and is set in the variable fno.

In step S411, the file data is read from the storage medium using the number set in the variable fno. In step S412, the read file data is transmitted to the display unit, and the file data, for example, image data is displayed on the display unit. Then, control is returned to step S409.

In step S409, the retrieval position is set in the next position of the open file list, and it is determined whether or not there is an open number in the retrieval position.

Next, the file preview process (file opening process) according to the fourth mode for embodying the present invention is explained below.

The concept of the conventional file system is that middleware (file system) is to be implemented using only a basic process on a file as a function unit. Then, the process attained by repeatedly using the basic processes (function units of middleware), the process attained by combining the basic processes, etc. are to be realized by calling the function unit of the middleware.

By applying the conventional concept to the process of previewing a file to be performed with a condition specified, the flowchart of the file preview process according to the fourth mode for embodying the present invention, that is, the flowchart shown in FIG. 14A can be obtained.

In FIG. 14A, the process of opening one file (the file open process for 1 file) is one function unit provided for the file system, and the function unit of the file open process for one file is called from the application (for performing the process shown in FIG. 14A) for performing the preview process on the file satisfying a specified condition.

Figure 14B:
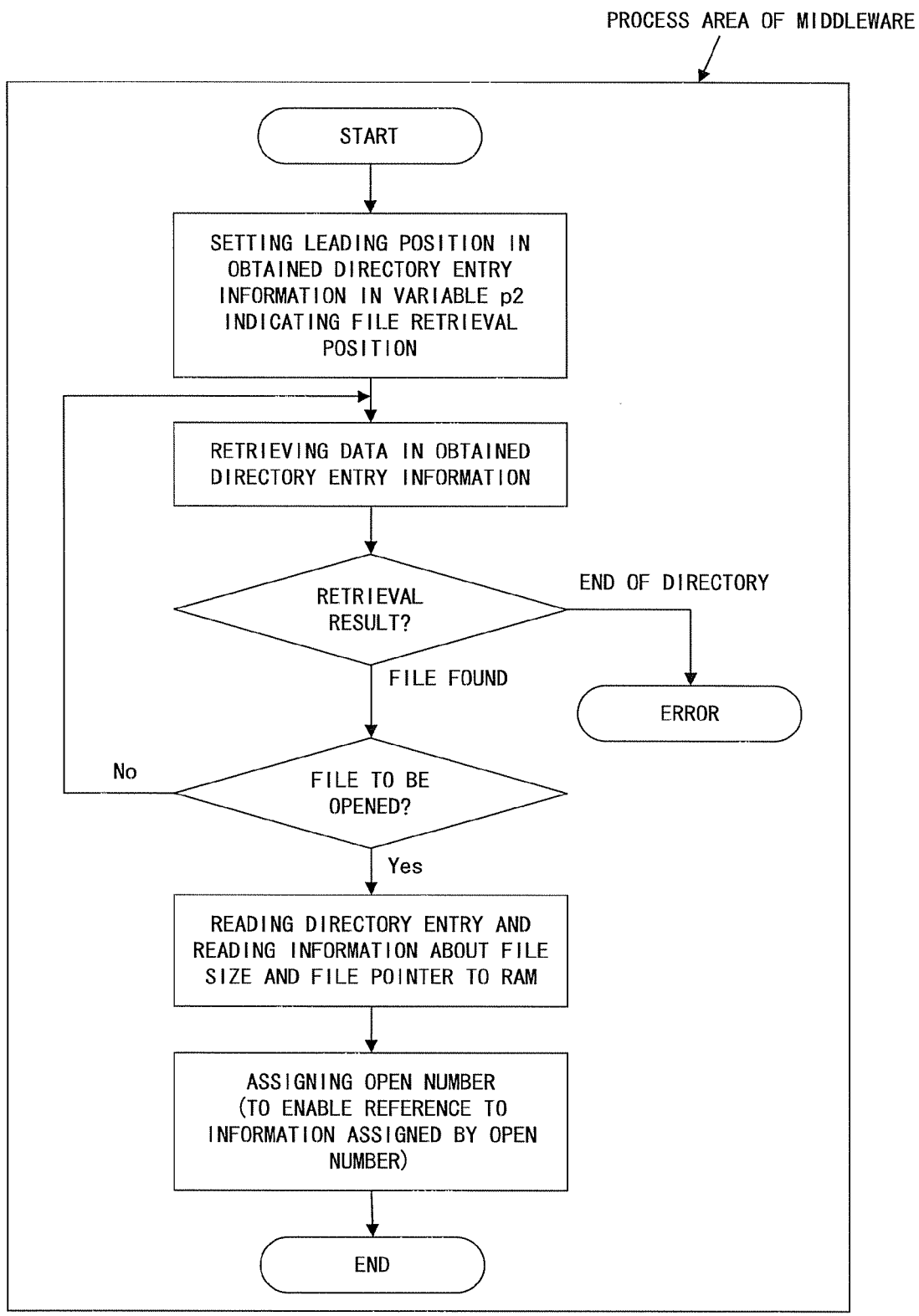
FIG. 14B is a flowchart of the file opening process for one file on which the function unit of the file system is performed.

FIG. 14B is a flowchart of the opening process for one file. The flowchart shown in FIG. 15 is obtained by combining the flowcharts shown in FIGS. 14A and 14B.

The process of the flowchart shown in FIG. 15 is explained below.

First, in step S501, the directory entry information of the directory storing the file to be previewed is obtained from the secondary storage to the primary storage, and the leading retrieval position in the obtained directory entry information is set in the variable p1 indicating the file retrieval position.

In step S502, the data of the obtained directory entry information is retrieved, and it is determined whether or not there is a file in the directory entry information. If YES, it is determined whether or not the file satisfies the condition to be satisfied by the file to be previewed.

In step S503, the retrieval result in step S502 is obtained. The retrieval result is divided into two cases, that is, the case where a file is found, and the case where the end of the directory entry information is reached.

If it is determined in step S503 that the end of the directory entry information is reached, a series of processes are terminated.

If it is determined in step S503 that a file has been found, then it is determined in step S504 whether or not the found file satisfies the condition to be satisfied by the file to be previewed.

In step S504, if it is determined that the found file does not satisfy the condition to be satisfied by a file to be deleted, then control is returned to step S502, and the next retrieval position is set in the variable p1, and the retrieval is continued.

If it is determined in step S504 that the found file satisfies the condition to be satisfied by a file to be deleted, then control is passed to step S505.

In FIG. 15, the processes in steps S505 through S510 are performed by the function unit of middleware.

The flowchart shown in FIG. 15 externally has a retrieval loop for the directory entry information from steps S502 to S512. The retrieval loop includes a retrieval loop of the directory entry information from step S506 to step S508. The retrieval loop of the directory entry information is double for the case where the position of a file in the secondary storage (storage medium) is rewritten while the processes in steps S501 through S504 shown in FIG. 15 are performed as described above by referring to the second mode for embodying the present invention. That is, as shown in FIG. 15, in the retrieval loop in steps S506 through S508, the retrieval is to be performed by obtaining the latest directory entry information.

Since the processes in steps S505 through S510 are the processes of middleware, exclusive control is performed on the device driver while the steps are performed. That is, although the device driver accepts a write request to the secondary storage from another task, it does not perform a write to the secondary storage at a request from another task while the steps in S505 through S510 are performed.

Described below are the steps S505 through S510.

First, in step S505, the directory entry information about the directory storing the file to be previewed is obtained from the secondary storage to the primary storage. The leading retrieval position in the obtained directory entry information is set in the variable p2 indicating the file retrieval position.

In step S506, the data in the obtained directory entry information is retrieved, and it is determined whether or not a file is detected in the directory entry. If YES, it is determined whether or not the file satisfies the condition to be satisfied by a file to be previewed.

In step S507, a retrieval result in step S506 is obtained. The retrieval result is divided into two cases, that is, the case where a file is found, and the case where the end of the directory entry information is reached.

If it is determined in step S507 that the end of the directory entry information is reached, a series of processes are terminated.

If it is determined in step S507 that a file has been found, then it is determined in step S508 whether or not the found file satisfies the condition to be satisfied by the file to be previewed.

In step S508, if it is determined that the found file does not satisfy the condition to be satisfied by a file to be previewed, then control is returned to step S506, and the next retrieval position is set in the variable p1, and the retrieval is continued.

If it is determined in step S508 that the found file satisfies the condition to be satisfied by a file to be previewed, the file size and the file pointer of the found file are read to the primary storage in step S509. In step S510, an open number is assigned to the read file size and the file pointer, and control is returned to the application of the caller.

In the application to which control is passed from one function unit of the file system (steps S505 through S510), the open number assigned in step S510 is set in the variable fno in step S511, and the file data is read from the storage medium using the number set in the variable fno. Then in step S512, the read file data is transmitted to the display unit, thereby displaying the file data, for example, image data, on the display unit. Then, control is returned to step S502.

In step S502, the retrieval position is set to the next position, and the data in the directory entry information is retrieved.

The file preview process performed with the specified condition of the fourth mode for embodying the present invention is compared with the file preview process performed with the specified condition of the third mode for embodying the present invention.

First, the open file list generating process (file opening process) in the file preview process performed with the specified condition of the third mode for embodying the present invention is a function unit in the file system (middleware). Therefore, during the performance, the exclusive control can be easily performed on the device driver. As a result, in the process according to the third mode for embodying the present invention, it is possible to avoid the double retrieval loop of the directory entry information shown in the flowchart shown in FIG. 15, and the retrieval time as a part of the file preview process can be greatly shortened.

The retrieval time is proportional to the square of the number of files in the directory entry to be retrieved in the fourth mode for embodying the present invention while it is proportional to the number of files in the directory entry in the third mode for embodying the present invention. Therefore, the simulation result between the file retrieval time shown in FIG. 11 in which the first and second modes for embodying the present invention are compared also holds between the third and fourth modes for embodying the present invention.

The third and fourth modes for embodying the present invention can be applied to any file processing performed by opening a file satisfying a condition. Such file processing can be a file preview process, a process of writing data to a file satisfying the opening condition, a process of reading data from a file satisfying the opening condition, etc.

Figure 16:
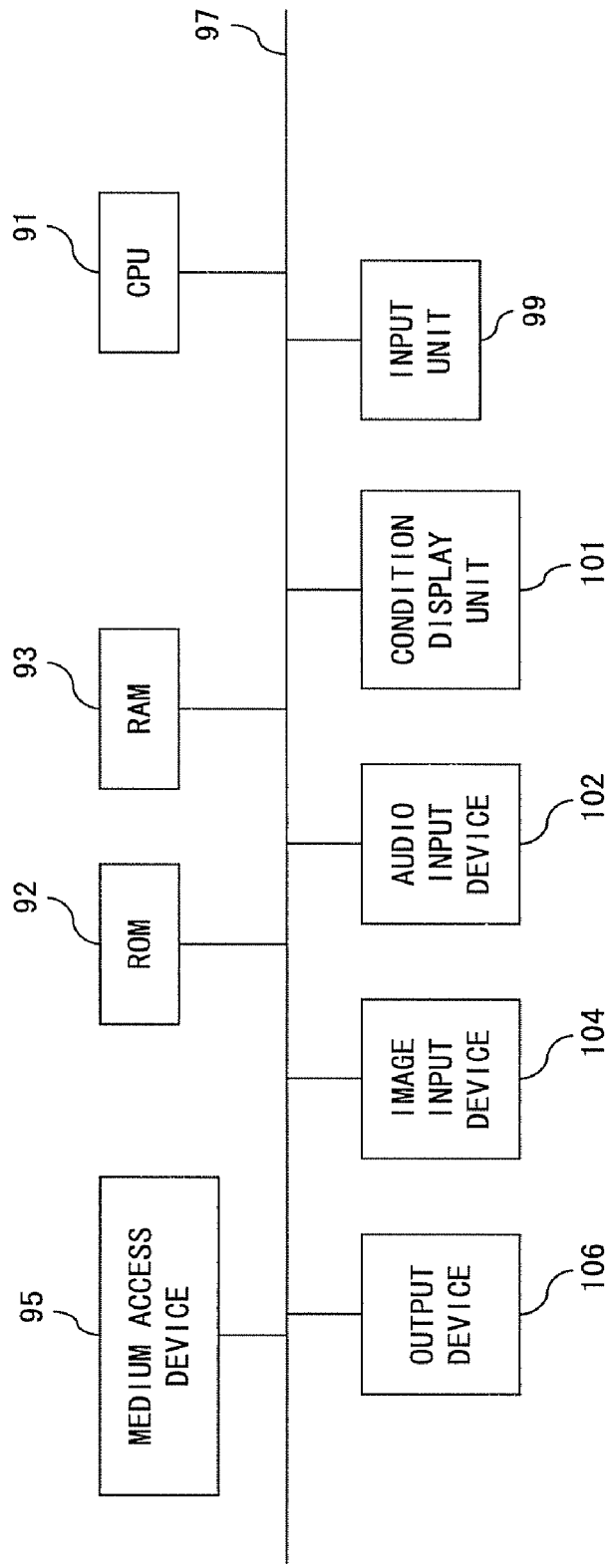
FIG. 16 shows the hardware environment (1) when each mode for embodying the present invention is realized by a program.

The file delete processing unit in each mode for embodying the present invention, and the preprocessing unit (file opening unit) for file processing using an opened file can be constituted as software. FIG. 16 shows the hardware environment when each mode for embodying the present invention is executed by a program.

In FIG. 16, a device for processing various types of information such as image information, audio information, etc. as hardware, or a device for processing any of the information is considered. For example, in the case of a digital camera, a audio input device 102 can be omitted. In the case of a voice recorder, an image input device 104 can be omitted. A personal computer, a mobile telephone, etc. are provided in most cases with both audio input device 102 and image input device 104. That is, depending on the target hardware, any unit shown in FIG. 16 can be omitted.

In FIG. 16, a computer as hardware comprises a CPU 91, ROM 92, RAM (primary storage) 93, a medium access device 95, an input unit 99, a condition display unit 101, an audio input device 102, an image input device 104, and an output device 106, and they are connected over a bus 97.

In FIG. 16, the CPU 91 controls the entire computer. The programs of the file delete processing unit, the preprocessing unit for file processing, etc. are executed on the RAM 93.

Through the input unit 99, a user specifies a condition, etc. for the file delete process of the present invention and the process performed by opening a file.

For example, the following condition can be specified as a condition to be satisfied by a file to be deleted or opened.

1. file number (starting and terminating numbers for specification of a target file)
2. extension
3. file attribute (for example, whether or not "read only")
4. time stamp (specification of a target file for starting and terminating update date and time)

In the DCF standard used for a digital camera, since a file name is to be specified by a number, a target file in the range of the file number of the condition 1 can be specified. The DCF is short for design rule for camera file system, and the DCF standard refers to an image format for a digital camera regulated by the JEIDA. A user can confirm the specification result of the condition performed through the input unit 99 on the condition display unit 101.

Audio information is fetched in the computer through the audio input device 102. An audio file can be regenerated and output through the output device 106. The image information can be fetched in the computer through the image input device 104. The image file can be output through the output device 106. Various types of information such as image information, audio information, etc. stored in the secondary storage can be fetched in the computer through the medium access device 95. The information fetched through the medium access device 95 can be output through the output device 106.

The information about a file to be processed can be stored in the secondary storage. The file information is read to the RAM 93 through the medium access device 95 during the file processing.

In a hardware environment different from the environment shown in FIG. 16, a program according to each mode for embodying the present invention can be executed. As shown in FIG. 17, in the other hardware device (file processing device), a processor 111 for performing only a determined process, RAM 112, ROM 113 storing a program according to each mode for embodying the present invention, an input unit 114 for inputting a condition, etc. for designation of a file to be processed, and a medium access device 115 for use in accessing a secondary storage (storage medium) are connected over a bus 116. The information about a file to be processed is stored in the secondary storage. The file information is read to the RAM 112 through the medium access device 115.

Figure 18:
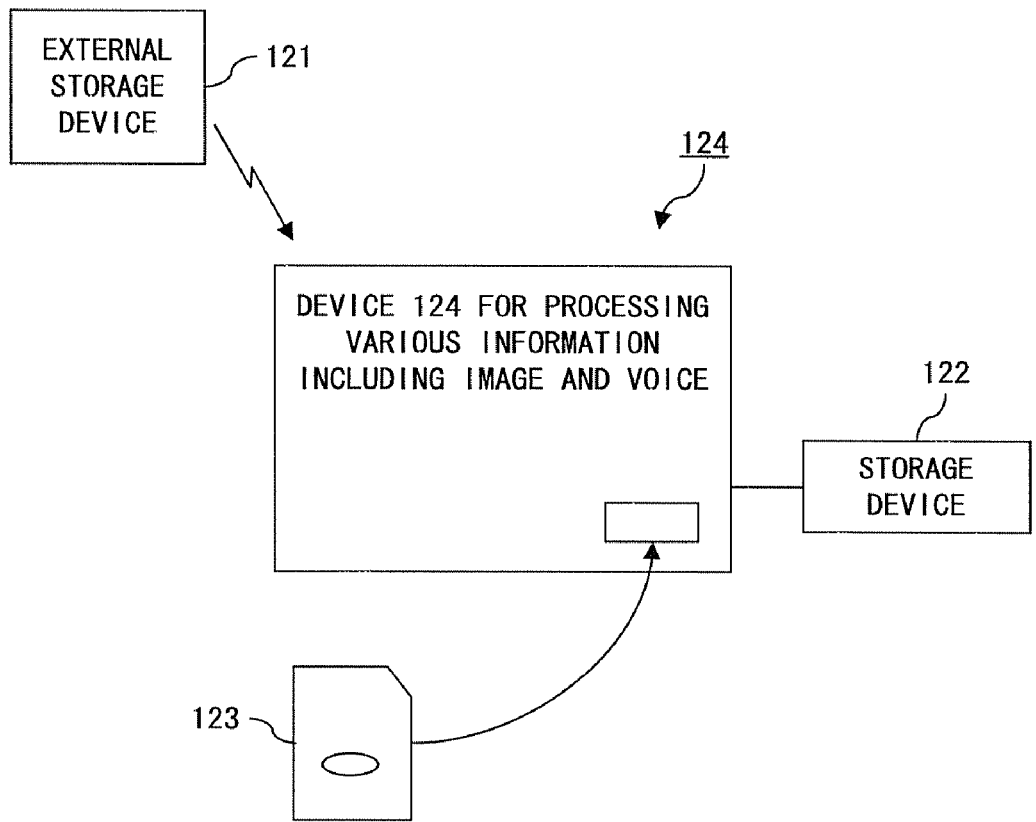
FIG. 18 shows an example of a storage medium.

FIG. 18 shows an example of a storage medium.

The file delete process and the file opening process according to the present invention can be realized by a device for processing various types of information including image and audio information such as a digital camera, a voice recorder, a personal computer, a mobile telephone, etc., or a device 124 for processing any type of the information. In this case, a program, etc. for the process according to the present invention can be loaded for execution into the memory of the device 124 from a storage device 122 of the device 124, a program, etc. for the process according to the present invention can be loaded for execution into the memory of the device 124 from a portable storage medium 123, and a program, etc. for the process according to the present invention can be loaded for execution into the memory of the device 124 over a network from an external storage device 121.

What is claimed is:

1. A file delete method used by a computer performing a process of outputting to a device driver side a directive corresponding to a directive to delete a file satisfying a predetermined condition from an application, the file delete method comprising:

a directory entry obtaining step of obtaining in primary storage from an actual data area in secondary storage one cluster of directory entry information in a directory storing a file to be deleted, the secondary storage being a flash memory on which data is read and written in units of cluster;

a delete mark adding step of determining whether the file in the obtained directory entry satisfies the predetermined condition specified from the application, not adding a delete mark to the file in the obtained directory entry when the file in the obtained directory entry does not satisfy the predetermined condition, not adding a delete mark to the file in the obtained directory entry in a case where the file in the obtained directory entry has a file attribute of read only or write protect even when the file in the obtained directory entry satisfies the predetermined condition, and adding in the primary storage a delete mark to the file in the obtained directory entry when the file in the obtained directory entry satisfies the predetermined condition and does not have a file attribute of read only nor write protect;

a freeing step of freeing FAT information stored in a FAT in the secondary storage corresponding to the file to which the delete mark is added; and a directory entry writing step of writing contents of the directory entry in the primary storage to a corresponding portion in the actual data area in the secondary storage when the delete mark adding step is performed on all files in the obtained directory entry; and a step of deleting as a target a file in the secondary storage according to a file allocation tables (FAT) file system;

wherein the directory entry information includes file name and the delete mark is data added to the file name.

2. The method according to claim 1, wherein:

when the directory entry information obtained in the directory entry obtaining step is to be continued, the directory entry obtaining step is restarted, and one cluster of the subsequent directory entry information is obtained; and the delete mark adding step, the freeing step, and the directory entry writing step are activated for the subsequent directory entry information.

3. The method according to claim 1, further comprising a FAT information obtaining step of obtaining in the primary storage a predetermined number of items of the FAT information stored in the FAT stored in the secondary storage, wherein the freeing step performs on each item of the FAT corresponding to the file to which the delete mark is added;

freeing an item in the FAT information obtained in the primary storage when an item to be freed is contained in the FAT information obtained in the primary storage; and writing the obtained FAT information to a corresponding portion of the FAT in the secondary storage when no item to be freed is contained in the obtained FAT information; restarting the FAT information obtaining step to obtain in the primary storage a predetermined number of items of the FAT information including the item to be freed; and freeing the item in the FAT information obtained in the primary storage.

4. The method according to claim 1, wherein the computer is built in a digital camera.

5. A file delete method used by a file processing device performing a process of outputting to a device driver side a directive corresponding to a directive to delete a file satisfying a predetermined condition from an application, the file delete method comprising:

a directory entry obtaining step of obtaining in primary storage from an actual data area in secondary storage one cluster of directory entry information in a directory storing a file to be deleted, the secondary storage being a flash memory on which data is read and written in units of cluster;

a delete mark adding step of determining whether the file in the obtained directory entry satisfies the predetermined condition specified from the application, not adding a delete mark to the file in the obtained directory entry when the file in the obtained directory entry does not satisfy the predetermined condition, not adding a delete mark to the file in the obtained directory entry in a case where the file in the obtained directory entry has a file attribute of read only or write protect even when the file in the obtained directory entry satisfies the predetermined condition, and adding in the primary storage a delete mark to the file in the obtained directory entry when the file in the obtained directory entry satisfies the predetermined condition and does not have a file attribute of read only nor write protect;

a freeing step of freeing FAT information stored in a FAT in the secondary storage corresponding to the file to which the delete mark is added; and a directory entry writing step of writing contents of the directory entry in the primary storage to a corresponding portion in the actual data area in the secondary storage when the delete mark adding step is performed on all files in the obtained directory entry; and a step of deleting as a target a file in the secondary storage according to a file allocation tables (FAT) file system;

wherein the directory entry information includes file name and the delete mark is data added to the file name.

6. The method according to claim 5, wherein the file processing device is built in a digital camera.

7. A file delete method used by a computer performing a process of outputting to a device driver side a directive corresponding to a directive to delete a file satisfying a predetermined condition from an application, the file delete method comprising:

a directory entry obtaining step of obtaining one cluster of directory entry information in a directory storing a file to be deleted in primary storage from an actual data area in secondary storage, the secondary storage being a flash memory on which data is read and written in units of cluster;

a delete mark adding step of determining whether the file in the obtained directory entry satisfies the predetermined condition specified from the application, not adding a delete mark to the file in the obtained directory entry when the file in the obtained directory entry does not satisfy the predetermined condition, not adding a delete mark to the file in the obtained directory entry in a case where the file in the obtained directory entry has a file attribute of read only or write protect even when the file in the obtained directory entry satisfies the predetermined condition, and adding in the primary storage a delete mark to the file in the obtained directory entry when the file in the obtained directory entry satisfies the predetermined condition and does not have a file attribute of read only nor write protect;

a directory entry writing step of writing a process result of the delete mark adding step to a corresponding portion of an actual data area in the secondary storage; and a freeing step of freeing FAT information stored in a FAT in the secondary storage corresponding to the file to which the delete mark is added; and a step of deleting as a target a file in the secondary storage according to a file allocation tables (FAT) file system;

wherein the directory entry information includes file name and the delete mark is data added to the file name.

8. The method according to claim 7, further comprising a FAT information obtaining step of obtaining in the primary storage a predetermined number of items of the FAT information stored in the FAT stored in the secondary storage, wherein the freeing step performs on each item of the FAT corresponding to the file to which the delete mark is added;

freeing an item in the FAT information obtained in the primary storage when an item to be freed is contained in the FAT information obtained in the primary storage; and writing the obtained FAT information to a corresponding portion of the FAT in the secondary storage when no item to be freed is contained in the obtained FAT information; restarting the FAT information obtaining step to obtain in the primary storage a predetermined number of items of the FAT information including the item to be freed; and freeing the item in the FAT information obtained in the primary storage.

9. The method according to claim 7, wherein
the computer is built in a digital camera.

10. A file delete method used by a file processing device performing a process of outputting to a device driver side a directive corresponding to a directive to delete a file satisfying a predetermined condition from an application, the file delete method comprising:

a directory entry obtaining step of obtaining one cluster of directory entry information in a directory storing a file to be deleted in primary storage from an actual data area in secondary storage, the secondary storage being a flash memory on which data is read and written in units of cluster;

a delete mark adding step of determining whether the file in the obtained directory entry satisfies the predetermined condition specified from the application, not adding a delete mark to the file in the obtained directory entry when the file in the obtained directory entry does not satisfy the predetermined condition, not adding a delete mark to the file in the obtained directory entry in a case where the file in the obtained directory entry has a file attribute of read only or write protect even when the file in the obtained directory entry satisfies the predetermined condition, and adding in the primary storage a delete mark to the file in the obtained directory entry when the file in the obtained directory entry satisfies the predetermined condition and does not have a file attribute of read only nor write protect;

a directory entry writing step of writing a process result of the delete mark adding step to a corresponding portion of an actual data area in the secondary storage; and a freeing step of freeing FAT information stored in a FAT in the secondary storage corresponding to the file to which the delete mark is added; and a step of deleting as a target a file in the secondary storage according to a file allocation tables (FAT) file system;

wherein the directory entry information includes file name and the delete mark is data added to the file name.

11. The method according to claim 10, wherein
the file processing device is built in a digital camera.

12. A storage medium storing a file delete program used by a computer performing a process of outputting to a device driver side a directive corresponding to a directive to delete a file satisfying a predetermined condition from an application, the program comprising:

a directory entry obtaining step of obtaining in primary storage from an actual data area in secondary storage one cluster of directory entry information in a directory storing a file to be deleted, the secondary storage being a flash memory on which data is read and written in units of cluster;

a delete mark adding step of determining whether the file in the obtained directory entry satisfies the predetermined condition specified from the application, not adding a delete mark to the file in the obtained directory entry when the file in the obtained directory entry does not satisfy the predetermined condition, not adding a delete mark to the file in the obtained directory entry in a case where the file in the obtained directory entry has a file attribute of read only or write protect even when the file in the obtained directory entry satisfies the predetermined condition, and adding in the primary storage a delete mark to the file in the obtained directory entry when the file in the obtained directory entry satisfies the predetermined condition and does not have a file attribute of read only nor write protect;

a freeing step of freeing FAT information stored in a FAT in the secondary storage corresponding to the file to which the delete mark is added; and a directory entry writing step of writing contents of the directory entry in the primary storage to a corresponding portion in the actual data area in the secondary storage when the delete mark adding step is performed on all files in the obtained directory entry; and a deleting step to delete as a target a file in the secondary storage according to a file allocation tables (FAT) file system;

wherein the directory entry information includes file name and the delete mark is data added to the file name.

13. The storage medium according to claim 12, wherein:
when the directory entry information obtained in the directory entry obtaining step is to be continued, the directory entry obtaining step is restarted, and one cluster of the subsequent directory entry information is obtained; and
the delete mark adding step, the freeing step, and the directory entry writing step are activated for the subsequent directory entry information.

14. The storage medium according to claim 12, further comprising a FAT information obtaining step of obtaining in the primary storage a predetermined number of items of the FAT information stored in the FAT stored in the secondary storage, wherein the freeing step performs on each item of the FAT corresponding to the file to which the delete mark is added:

freeing an item in the FAT information obtained in the primary storage when an item to be freed is contained in the FAT information obtained in the primary storage; and writing the obtained FAT information to a corresponding portion of the FAT in the secondary storage when no item to be freed is contained in the obtained FAT information; restarting the FAT information obtaining step to obtain in the primary storage a predetermined number of items of the FAT information including the item to be freed; and freeing the item in the FAT information obtained in the primary storage.

15. The storage medium according to claim 12, wherein the computer is built in a digital camera.

16. A storage medium storing a file delete program used by a file processing device performing a process of outputting to a device driver side a directive corresponding to a directive to delete a file satisfying a predetermined condition from an application, the program comprising:
   a directory entry obtaining step of obtaining in primary storage from an actual data area in secondary storage one cluster of directory entry information in a directory storing a file to be deleted, the secondary storage being a flash memory on which data is read and written in units of cluster;
   a delete mark adding step of determining whether the file in the obtained directory entry satisfies the predetermined condition specified from the application, not adding a delete mark to the file in the obtained directory entry when the file in the obtained directory entry does not satisfy the predetermined condition, not adding a delete mark to the file in the obtained directory entry in a case where the file in the obtained directory entry has a file attribute of read only or write protect even when the file in the obtained directory entry satisfies the predetermined condition, and adding in the primary storage a delete mark to the file in the obtained directory entry when the file in the obtained directory entry satisfies the predetermined condition and does not have a file attribute of read only nor write protect;
   a freeing step of freeing FAT information stored in a FAT in the secondary storage corresponding to the file to which the delete mark is added; and
   a directory entry writing step of writing contents of the directory entry in the primary storage to a corresponding portion in the actual data area in the secondary storage when the delete mark adding step is performed on all files in the obtained directory entry; and
   a deleting step to delete as a target a file in the secondary storage according to a file allocation tables (FAT) file system;
   wherein the directory entry information includes file name and the delete mark is data added to the file name.

17. The storage medium according to claim 16, wherein the file processing device is built in a digital camera.

18. A storage medium storing a file delete program used by a computer performing a process of outputting to a device driver side a directive corresponding to a directive to delete a file satisfying a predetermined condition from an application, the program comprising:
   a directory entry obtaining step of obtaining one cluster of directory entry information in a directory storing a file to be deleted in primary storage from an actual data area in secondary storage, the secondary storage being a flash memory on which data is read and written in units of cluster;
   a delete mark adding step of determining whether the file in the obtained directory entry satisfies the predetermined condition specified from the application, not adding a delete mark to the file in the obtained directory entry when the file in the obtained directory entry does not satisfy the predetermined condition, not adding a delete mark to the file in the obtained directory entry in a case where the file in the obtained directory entry has a file attribute of read only or write protect even when the file in the obtained directory entry satisfies the predetermined condition, and adding in the primary storage a delete mark to the file in the obtained directory entry when the file in the obtained directory entry satisfies the predetermined condition and does not have a file attribute of read only nor write protect;
   a directory entry writing step of writing a process result of the delete mark adding step to a corresponding portion of an actual data area in the secondary storage; and
   a freeing step of freeing FAT information stored in a FAT in the secondary storage corresponding to the file to which the delete mark is added; and
   a deleting step to delete as a target a file in the secondary storage according to a file allocation tables (FAT) file system;
   wherein the directory entry information includes file name and the delete mark is data added to the file name.

19. The storage medium according to claim 18, further comprising
   a FAT information obtaining step of obtaining in the primary storage a predetermined number of items of the FAT information stored in the FAT stored in the secondary storage, wherein
   the freeing step performs on each item of the FAT corresponding to the file to which the delete mark is added;
   freeing an item in the FAT information obtained in the primary storage when an item to be freed is contained in the FAT information obtained in the primary storage; and
   writing the obtained FAT information to a corresponding portion of the FAT in the secondary storage when no item to be freed is contained in the obtained FAT information; restarting the FAT information obtaining step to obtain in the primary storage a predetermined number of items of the FAT information including the item to be freed; and freeing the item in the FAT information obtained in the primary storage.

20. The program according to claim 18, wherein the computer is built in a digital camera.

21. A storage medium storing a file delete program used by a file processing device performing a process of outputting to a device driver side a directive corresponding to a directive to delete a file satisfying a predetermined condition from an application, the program comprising:
   a directory entry obtaining step of obtaining one cluster of directory entry information in a directory storing a file to be deleted in primary storage from an actual data area in secondary storage, the secondary storage being a flash memory on which data is read and written in units of cluster;
   a delete mark adding step of determining whether the file in the obtained directory entry satisfies the predetermined condition specified from the application, not adding a delete mark to the file in the obtained directory entry when the file in the obtained directory entry does not satisfy the predetermined condition, not adding a delete mark to the file in the obtained directory entry in a case where the file in the obtained directory entry has a file attribute of read only or write protect even when the file in the obtained directory entry satisfies the predetermined condition, and adding in the primary storage a delete mark to the file in the obtained directory entry when the file in the obtained directory entry satisfies the predetermined condition and does not have a file attribute of read only nor write protect;
   a directory entry writing step of writing a process result of the delete mark adding step to a corresponding portion of an actual data area in the secondary storage; and
   a freeing step of freeing FAT information stored in a FAT in the secondary storage corresponding to the file to which the delete mark is added; and a deleting step to delete as a target a file in the secondary storage according to a file allocation tables (FAT) file system;
wherein the directory entry information includes file name and the delete mark is data added to the file name.

22. The storage medium according to claim 21, wherein the file processing device is built in a digital camera.

* * * * *